United States Patent
Seo et al.

(10) Patent No.: US 8,139,928 B2
(45) Date of Patent: Mar. 20, 2012

(54) METHOD OF CREATING PLAYBACK CONTROL FILE FOR RECORDING MEDIUM AND METHOD AND APPARATUS FOR REPRODUCING DATA USING THE PLAYBACK CONTROL FILE

(75) Inventors: Kang Soo Seo, Anyang-si (KR); Jea Yong Yoo, Seoul (KR); Byung Jin Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1200 days.

(21) Appl. No.: 10/992,088

(22) Filed: Nov. 19, 2004

(65) Prior Publication Data

US 2005/0135784 A1    Jun. 23, 2005

(30) Foreign Application Priority Data

Nov. 20, 2003  (KR) .................... 10-2003-0082584

(51) Int. Cl.
    *H04N 5/89* (2006.01)
(52) U.S. Cl. .................... 386/336; 386/326; 386/248
(58) Field of Classification Search .............. 386/95–96, 386/125–126

See application file for complete search history.

(56) References Cited

U.S. PATENT DOCUMENTS

| 6,999,674 | B1 * | 2/2006 | Hamada et al. | 386/95 |
|---|---|---|---|---|
| 2001/0038745 | A1 * | 11/2001 | Sugimoto et al. | 386/95 |
| 2002/0164152 | A1 * | 11/2002 | Kato et al. | 386/95 |
| 2003/0133375 | A1 | 7/2003 | Yoshioka | |
| 2003/0215209 | A1 * | 11/2003 | Kawaguchi | 386/7 |

FOREIGN PATENT DOCUMENTS

| CN | 1383678 | 12/2002 |
|---|---|---|
| JP | 2002-247526 | 8/2002 |
| KR | 1998-0042894 | 8/1998 |
| KR | 2001-0070072 | 7/2001 |
| KR | 1020020057441 | 7/2002 |
| WO | WO 2005/050528 | 6/2005 |
| WO | WO 2005/050529 | 6/2005 |

OTHER PUBLICATIONS

International Search Report dated Jun. 8, 2005.
Office Action for corresponding Chinese Application No. 200480033837.0 dated Aug. 8, 2008.
Office Action for corresponding Indian Application No. 1176/KOLNP/2006 dated May 31, 2010.
Office Action for corresponding Japanese Application No. 2006-541029 dated Feb. 26, 2010.
Office Action for corresponding Korean Application No. 10-2006-7012228 dated Mar. 16, 2011.
Office Action for corresponding Malaysian application dated Apr. 22, 2008.

* cited by examiner

*Primary Examiner* — Jamie Atala
(74) *Attorney, Agent, or Firm* — Harness, Dickey & Pierce

(57) ABSTRACT

A method of creating the playback control file for a recording medium and a method and apparatus for reproducing data using the playback control file are disclosed. The method includes reading an original PlayList including at least one original PlayItem from the recording medium, the at least one original PlayItem being configured to reproduce original data recorded on the recording medium, downloading at least one additional PlayItem from an external source, the at least one additional PlayItem being configured to reproduce additional data downloadable from the external source, and creating a new PlayList by binding the original PlayList with the at least one additional PlayItem, the new PlayList being able to reproduce the original data and the additional data, individually or in combination.

35 Claims, 19 Drawing Sheets

Additional clip
(downloadable from external source)

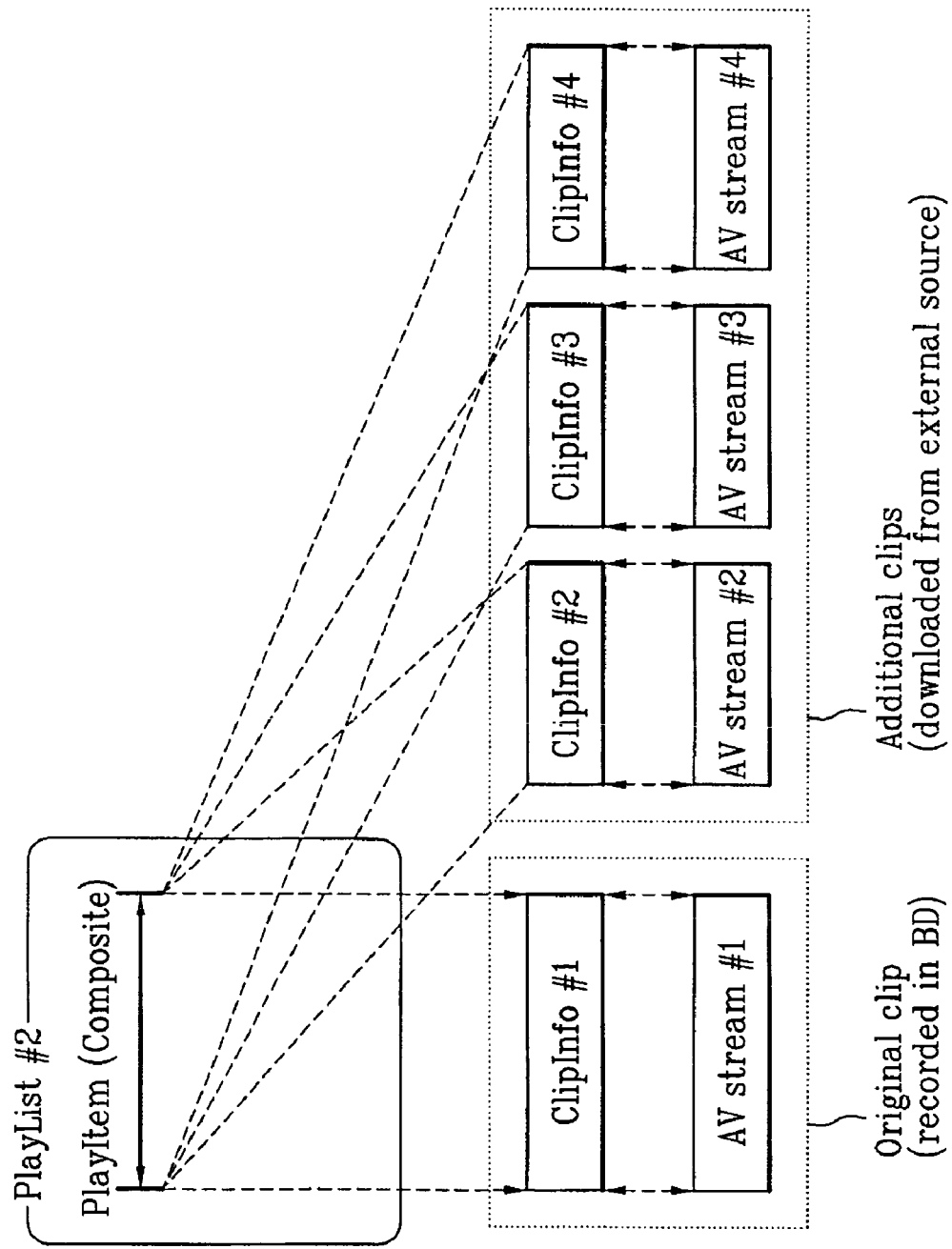

Original clip (recorded in BD)

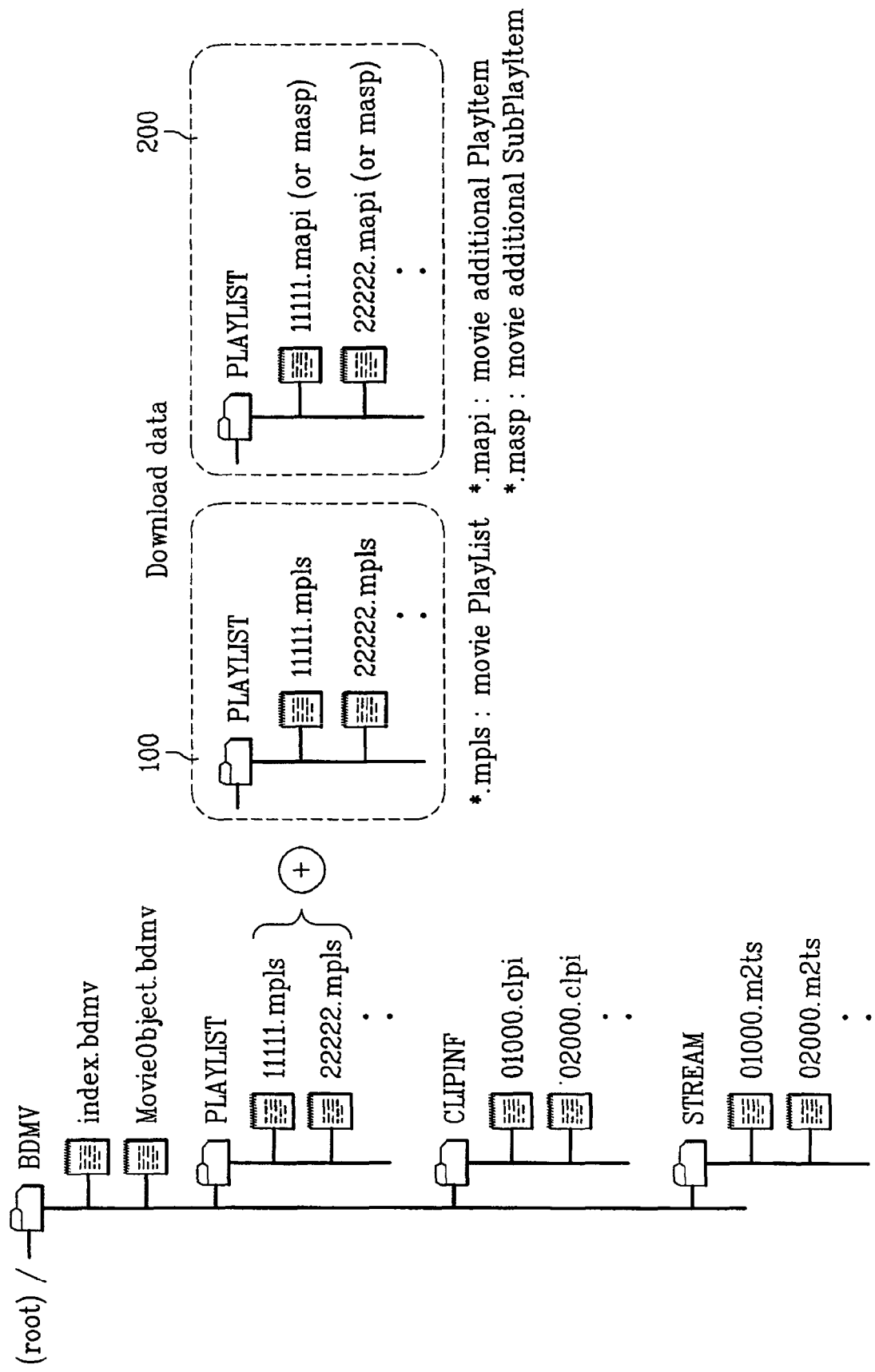

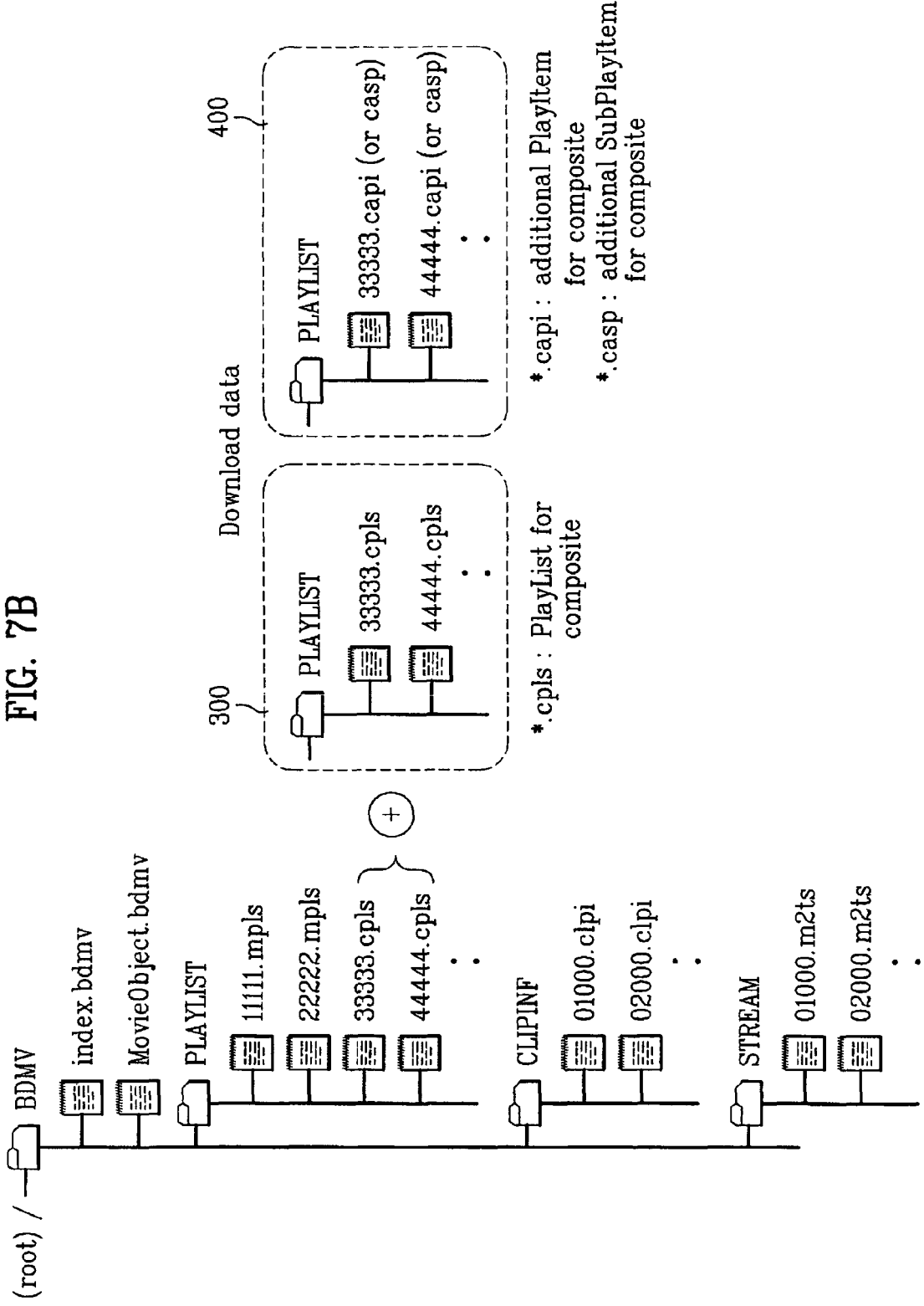

```
PID_Table () {
    length
    number_of_PID_entries
    for (k=0: k< number_of_PID_entries: k++) {
        ref_to_stream_PID(k)
        attributes
        sub_PlayItem_num
    }
}
```

METHOD OF CREATING PLAYBACK CONTROL FILE FOR RECORDING MEDIUM AND METHOD AND APPARATUS FOR REPRODUCING DATA USING THE PLAYBACK CONTROL FILE

This application claims the benefit of the Korean Patent Application No. 10-2003-0082584, filed on Nov. 20, 2003, which is hereby incorporated by reference as if fully set forth herein.

BACKGROUND OF THE INVENTION

1. Field of the Invention

The present invention relates to a recording medium, and more particularly, to a method of creating a playback control file for a recording medium and method and apparatus for reproducing data using the playback control file. Although the present invention is suitable for a wide scope of applications, it is particularly suitable for creating a playback control file that enables data being recorded on the recording medium and data existing within an external source to be used in combination, and for playing-back the playback control file.

2. Discussion of the Related Art

Optical discs are widely used as a recording medium for recording mass data. Presently, among a wide range of optical discs, a new high density optical recording medium, such as a blu-ray disc (hereinafter referred to as "BD"), is under development for recording (or writing) and storing high definition video and audio data for a long period of time. Currently, the blu-ray disc (BD), which is known to be the next generation recording medium technology, is under development as a next generation optical recording solution that is capable of having data significantly surpassing the conventional DVD, along with many other digital apparatuses.

Most particularly, in the above-described optical recording and/or reproducing apparatus, the basic function(s) of recording and/or reproducing the blu-ray disc (BD), as well as additional functions taking into account a combined usage with related peripheral digital apparatuses are/is being considered. Thus, generally, the optical recording and/or reproducing apparatus must be provided with functions of either receiving external input signals and displaying the received signals, or applying external input signals with a built-in blu-ray disc (BD) playback signal for reproduction.

However, since preferable playback (or reproducing) methods for reproducing a combination of the external input signal and the built-in blu-ray disc (BD) playback signal are not yet known and familiarized, there are many restrictions in the full-scale development of a blu-ray disc (BD)-based optical recording and/or reproducing apparatus. And, such restrictions cause problems in the field of reproducing the external input signal and the built-in blu-ray disc (BD) playback signal as one single reproducing unit.

SUMMARY OF THE INVENTION

Accordingly, the present invention is directed to a method of creating a playback control file for a recording medium and method and apparatus for reproducing data using the playback control file that substantially obviates one or more problems due to limitations and disadvantages of the related art.

An object of the present invention is to provide a method and apparatus for reproducing data using the playback control file that are suitable for a recording medium, such as a blu-ray disc (BD).

Another object of the present invention is to provide a method for control and playing-back a Composite PlayList file of a high density optical disc, wherein a signal recorded in a blu-ray disc (BD) and a signal existing in an external source outside of the disc are bound together for reproduction (or playback), as standardized information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of creating a playback control file for a recording medium includes reading an original PlayList including at least one original PlayItem from the recording medium, the at least one original PlayItem being configured to reproduce original data recorded on the recording medium, downloading at least one additional PlayItem from an external source, the at least one additional PlayItem being configured to reproduce additional data downloadable from the external source, and creating a new PlayList by binding the original PlayList with the at least one additional PlayItem, the new PlayList being able to reproduce the original data and the additional data, individually or in combination. Herein, the new PlayList may include a composite PlayItem which is created by binding the at least one original PlayItem with the at least one additional PlayItem.

In another aspect of the present invention, a method of creating a playback control file for a recording medium includes reading an original PlayList including a plurality of original PlayItems from the recording medium, the plurality of original PlayItems being configured to reproduce original data recorded on the recording medium, downloading at least one additional PlayItem from an external source, the at least one additional PlayItem being configured to reproduce additional data downloadable from the external source, and creating a new PlayList by binding the original PlayList with the at least one additional PlayItem, the new PlayList being able to reproduce the original data and the additional data, individually or in combination. Herein, the new PlayList may include a composite PlayItem which is created by binding at least one of the plurality of original PlayItems with the at least one additional PlayItem. Alternatively, the new PlayList may also include the at least one additional PlayItem and at least one of the plurality of original PlayItems.

In another aspect of the present invention, a method of creating a playback control file for a recording medium includes reading an original PlayList including at least one original PlayItem from the recording medium, the at least one original PlayItem being configured to reproduce original data recorded on the recording medium, downloading a plurality of additional SubPlayItems from an external source, the plurality of additional SubPlayItems being configured to reproduce additional data downloadable from the external source, and creating a new PlayList by binding the original PlayList with the plurality of additional SubPlayItems, the new PlayList being able to reproduce the original data and the additional data, individually or in combination. Herein, the PlayList may include a composite SubPlayItem which is created by binding the plurality of additional SubPlayItems.

In a further aspect of the present invention, a recording medium includes a first data area for storing original data, and a second data area for storing an original PlayList and a new PlayList, the original PlayList including at least one original PlayItem configured to reproduce the original data, the new PlayList being created by binding the original PlayList with at least one PlayItem or SubPlayItem downloaded from an external source, wherein the new PlayList file is configured to reproduce the original data and additional data downloadable from an external source, individually or in combination.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 4A to 4C illustrate a method of creating a playback control file according to a first embodiment of the present invention;

FIGS. 7A and 7B illustrate examples of a file structure recorded within the optical disc, the optical disc being the recording medium, and a file structure for additional data associated with the recorded file structure according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "blu-ray disc (BD)" will be given as an example of the recording medium proposed herein. However, it will be apparent that the spirit or scope of the present invention may be equally applied to other types of recording medium.

Figure 1:
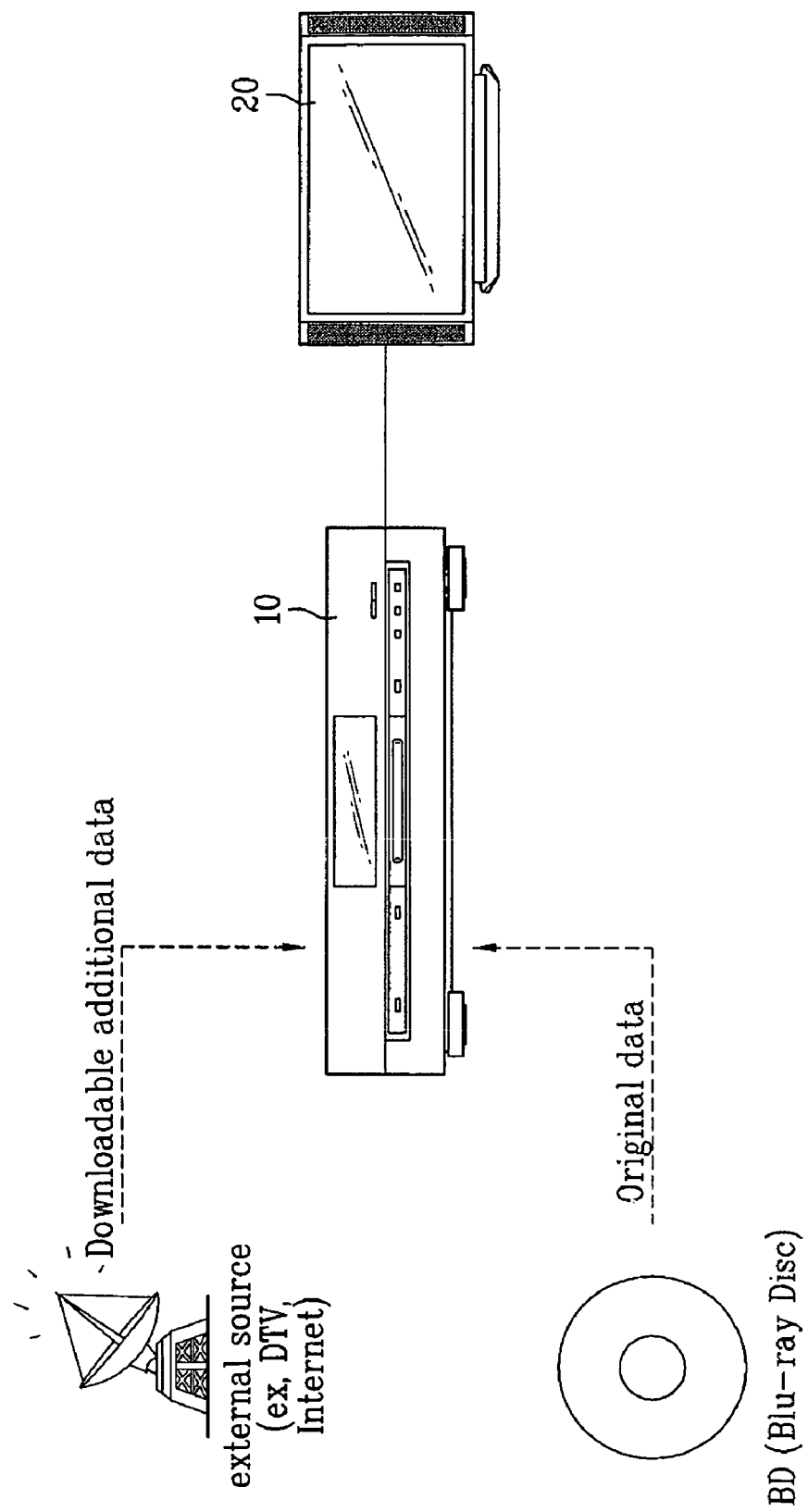
FIG. 1 illustrates a general view of the present invention.

FIG. 1 illustrates a general view of the present invention, which shows an example of a combined usage between an optical recording and/or reproducing apparatus 10 and peripheral apparatuses. The optical recording and/or reproducing apparatus 10 according to the present invention is an apparatus for recording and/or reproducing optical disc of various standards (or sizes). The optical recording and/or reproducing apparatus 10 may be designed to record and/or reproduce optical disc of a specific standard (e.g., a blu-ray disc (BD)). Alternatively, the apparatus may also be designed to only have a reproducing function and no recording function. However, considering the completion of the blu-ray disc (BD) standard and its connection with the peripheral apparatuses, either a BD-Player reproducing the blu-ray disc (BD) or a BD-Recorder recording and/or reproducing the blu-ray disc (BD) will be used as an example in the description of the present invention.

Apart from the function of recording and/or reproducing the disc, the optical recording and/or reproducing apparatus is also provided with a function of receiving an external input signal, processing the received signal, and transmitting the processed signal to a user through another external display 20. In this case, there are no limitations in the external signals that can be inputted, however, digital television (DTV) broadcast programs and the Internet are the most typical types of external signals. Most particularly, since the Internet is presently a medium that can be easily accessed by the public, users can make use of specific data provided on the Internet by downloading such data through the optical recording and/or reproducing apparatus.

Moreover, in the present invention, when original data is recorded on the optical disc (BD), which is loaded in the optical recording and/or reproducing apparatus 10, and additional data related to the original data exists in an external source, the original data and the additional data are bound together and reproduced. More specifically, for example, when a video stream and an audio stream (both in Korean) for a film dubbed in Korean are recorded as the original data on the optical disc, and when an audio stream (in English) for the original film in English exists on the Internet as the additional data, a user may, if desired, download the audio stream (in English), which is the additional data existing on the Internet and reproduce the downloaded audio stream (in English) along with the video stream within the original data. In order to meet with the demands of the user, a definition of the relation between the original data and the additional data is necessary, and a systematic method for controlling and reproducing such data as desired by the user is also required.

As aforementioned, the signal recorded within the disc is referred to as the original data and the signal existing in the external source is referred to as the additional data, for simplicity. However, such terms may vary depending upon the method of acquiring the data and are not limited to any specific type of data. Therefore, the additional data generally includes audio data, presentation graphic data, subtitle data, interactive graphic data, and so on. And, without being limited to the above-mentioned examples, it is possible to propose a binding of the original data and the additional data, wherein an audio stream (in English) is the original data and a video stream is the additional data.

In order to meet with the demands of the user, the original data and the additional data must be provided with a correlated (or co-linked) file structure (substantially an identical file structure), which will be described in detail with reference to FIGS. 2 and 3. Herein, FIGS. 2 and 3 illustrate a file structure and a data recording structure being recorded on a high density optical disc according to the present invention, respectively.

Figure 2:
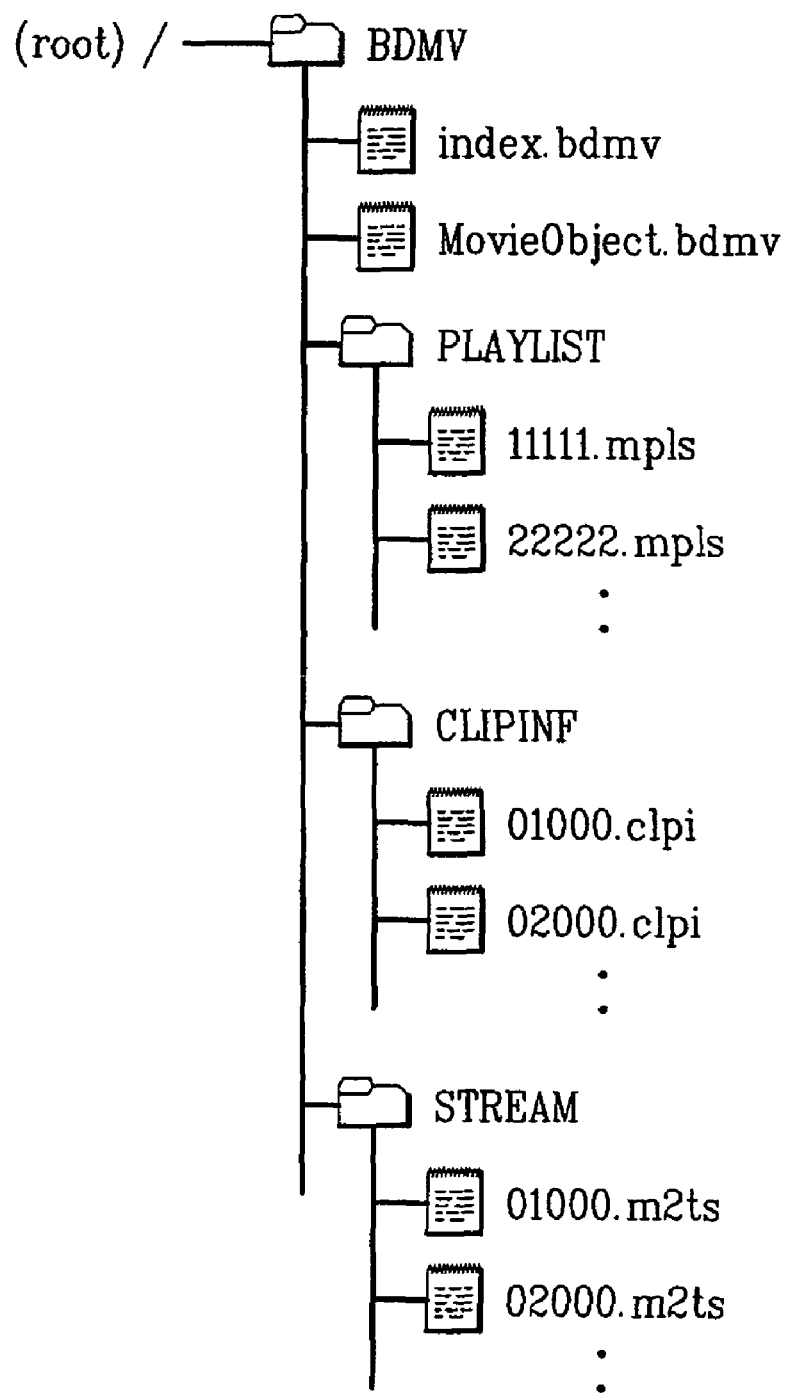
FIG. 2 illustrates a file structure being recorded on an optical disc, the optical disc being a recording medium, according to the present invention.
Figure 3:
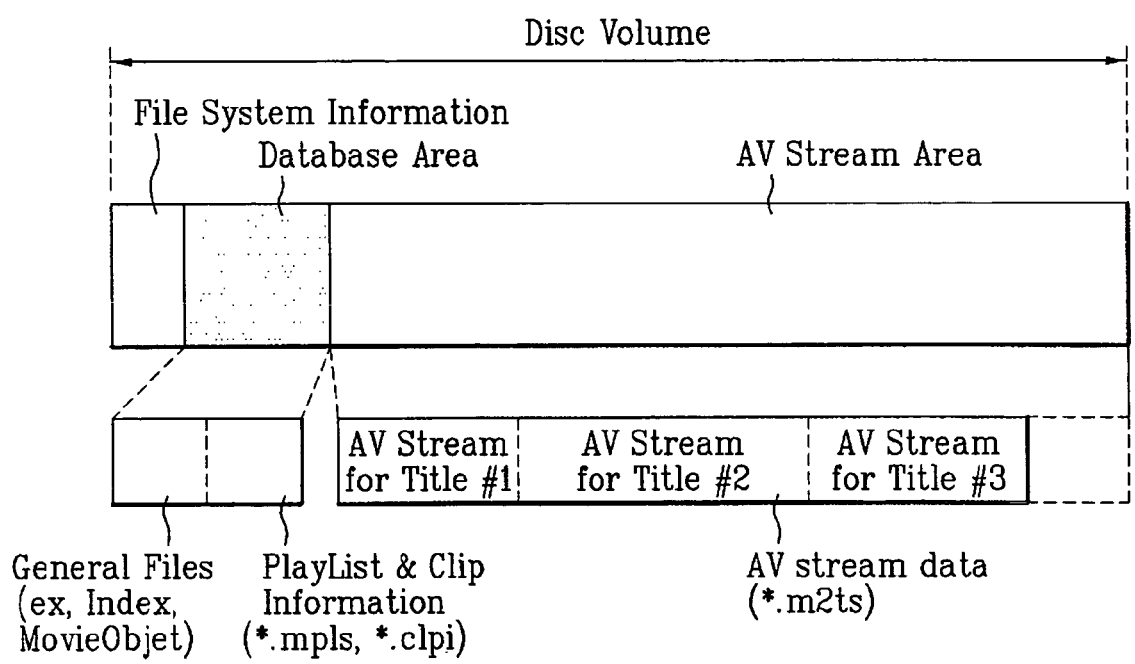
FIG. 3 illustrates a data recording structure being recorded on the optical disc, the optical disc being the recording medium, according to the present invention.

Referring to FIG. 2, which illustrates a file structure for controlling information recorded within the disc, at least one BD directory (BDMV) is included in a root directory (root). Each BD directory includes an "index.bdmv" and a "MovieObject.bdmv", which represent general files that are used when interacting with one or more users. For example, the index file contains data representing an index table which includes various information regarding a plurality of selectable menus and titles.

Each BD directory includes three file directories including data to be reproduced, and information required for reproducing the data. The file directories included in each BD directory are a stream directory (STREAM), a playlist directory (PLAYLIST), and a clip information directory (CLIPINF). The stream directory includes audio/video (AV) stream (hereinafter referred to as "AV stream") files. More specifically, the AV streams (01000.m2ts, 02000.m2ts) may generally be in the form of MPEG2 transport packets and be named as "*.m2ts". Furthermore, the clip information directory (CLIPINF) includes clip information files (01000.clpi, 02000.clpi) being in one-to-one correspondence with the AV stream files (clip files) included in the stream directory. A clip information file (*.clpi) includes property information and timing information of a corresponding AV stream (clip file), wherein the timing information includes mapping information that maps presentation time stamp (PTS) with source packet number (SPN) using entry point map.

In the BD standard, each pair of an AV stream (*.m2ts) and its corresponding clip information file (*.clpi), which are in one-to-one correspondence with one another, is designated as a clip. For example, 01000.clpi included in CLIPINF includes the property and timing information of 01000.m2ts included in STREAM, and 01000.clpi and 01000.m2ts form a clip. Hereinafter, the clip corresponding to the original data, which is recorded within the disc, will be referred to as an "original clip", and the clip corresponding to the additional data, which is downloadable from an external source (i.e., outside of the disc), will be referred to as an "additional clip".

Referring back to FIG. 2, the playlist directory (PLAYLIST) includes one or more PlayList files (*.mpls), wherein each PlayList file (*.mpls) includes at least one PlayItem which designates playing interval for a specific original clip. More specifically, a PlayItem includes information designating beginning and ending times (In-Time and Out-Time) for reproduction of a specific original clip, which may be designated by clip_Information_File_name within the PlayItem. Accordingly, a PlayList file (*.mpls) represents a basic playback control file for playing-back a desired clip from a binding of one or more PlayItems. Therefore, by providing a PlayItem appropriate for a corresponding playback purpose within the PlayList file (*.mpls), special playback functions, such as trickplay, skipplay, slideshow, and so on, can also be executed.

FIG. 3 illustrates a general view of the structure of the information related with the file structure being recorded on the disc. Starting from the inner circumference (or center) of the disc, the disc volume includes a file system information area occupying the inmost portion of the disc volume, an AV stream area occupying the outmost portion of the disc volume, and a database area occupied between the file system information area and the stream data area. In the file system information area, system information for controlling the entire data files is recorded. And, original data such as audio/video/graphic data are recorded in the AV stream area. The general files, PlayList files, and clip information files are recorded in the database area of the disc volume. Most particularly, as described above, the data recorded in the AV stream area within the disc is referred to as the original data. Therefore, by using the information within the database area, a user is able to select an AV stream the user desires to reproduce and decide and use the appropriate reproducing method of the selected AV stream.

The present invention is related to a method for reproducing the file structure and the original data recorded on the optical disc along with the additional data downloadable from the external source, as shown in FIGS. 2 and 3. A method of creating and controlling a playback control file, which can bind together and reproduce the original data and the additional data, according to a plurality of preferred embodiments will now be described in detail. Accordingly, the above-described playback control file within the disc refers to the PlayList file (*.mpls) and the clip information file (*.clpi). However, the clip information file (*.clpi), along with the stream file (*.m2ts), is provided either to the original clip or to the additional clip. Accordingly, in order to bind together and playback the original clip and the additional clip as one single playback unit, an independent PlayList file (*.mpls) is required. Hereinafter, the playback control file will be described with reference to the PlayList file (*.mpls) as the example.

In addition, for simplicity of the description, in the PlayList, the PlayItem controlling the original data is referred to as an original PlayItem or a first PlayItem (PlayItem #1), and the PlayItem controlling the additional data is referred to as an additional PlayItem or a second PlayItem (PlayItem #2). And, finally, the PlayItem binding or replacing or integrating the original PlayItem and the additional PlayItem so as to reproduce all of the original data and the additional data is referred to as a Composite PlayItem or a third PlayItem (PlayItem #3). Further, depending upon the proposed embodiments of the present invention, the second PlayItem (PlayItem #2) controlling the additional data may also be referred to as an additional SubPlayItem.

More specifically, in the present invention, the additional PlayItem or the additional SubPlayItem controlling the additional data is formed of a single independent file that is not included within the PlayList. Therefore, the additional data cannot be independently reproduced, and instead, the additional data can be reproduced only when formed as a new PlayList bound together with the original data. Thus, the additional data is prevented from being independently reproduced, and, having the effect of a usage authorization function in some embodiments, only the users having an optical disc included the original data recorded thereon are allowed to bind together the additional data with their original data.

Figure 4A:
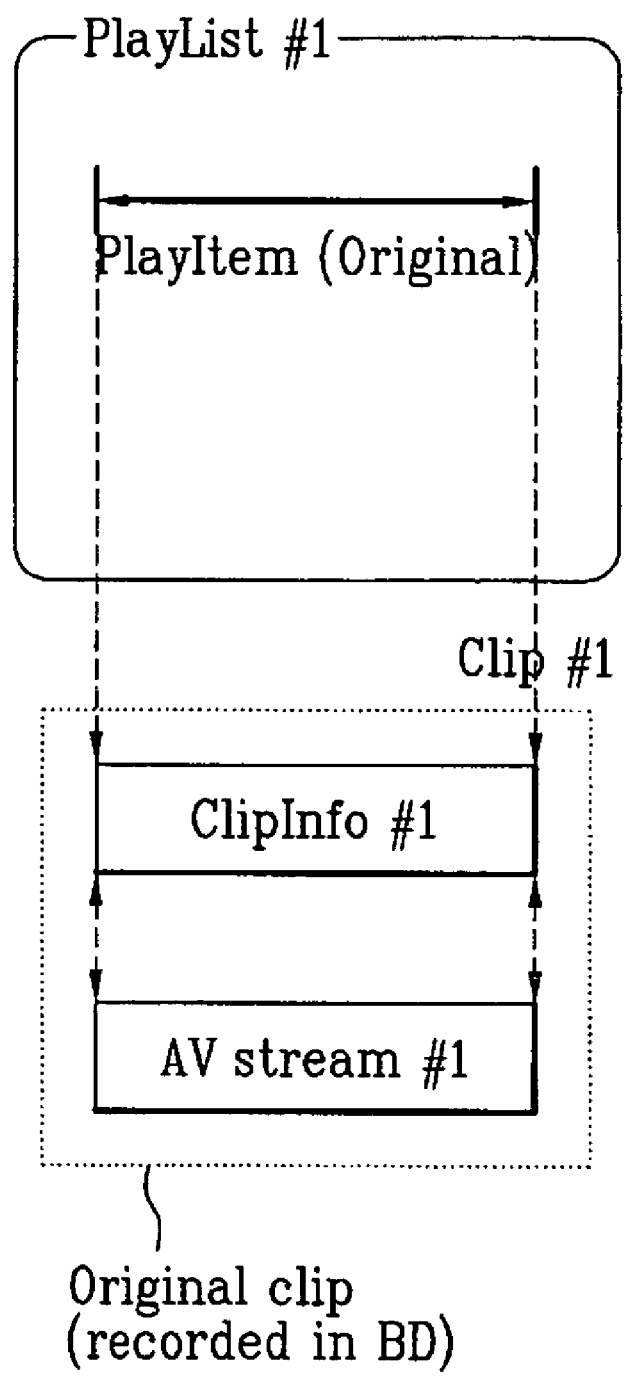
Figure 4B:
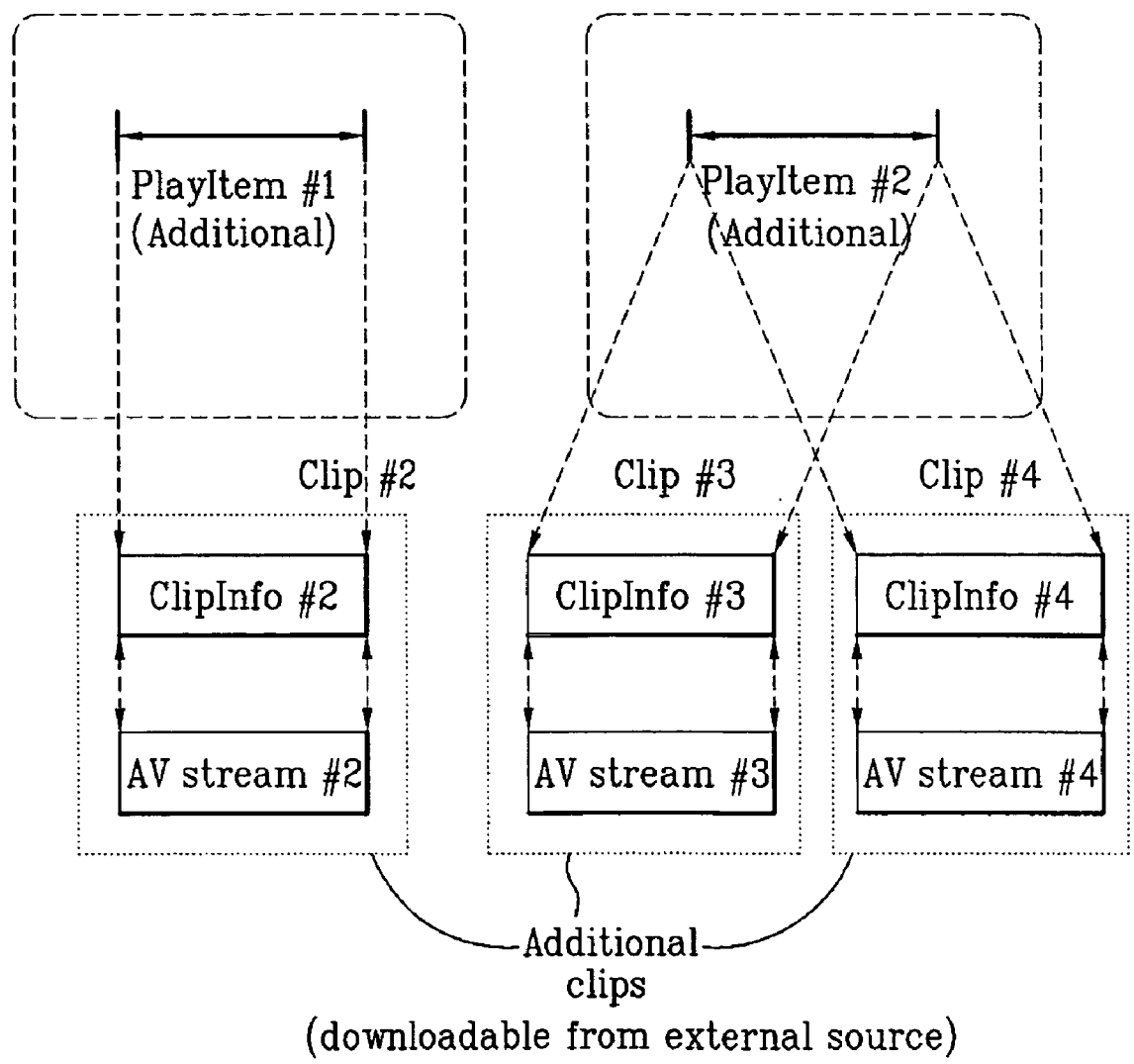

FIGS. 4A to 4C illustrate a method of creating a PlayList according to a first embodiment of the present invention, wherein the PlayList is the playback control file. FIG. 4A illustrates an original PlayList (PlayList #1) recorded on an optical disc. Herein, at least one original PlayItem is included within the original PlayList, and the original PlayItem designates a corresponding original clip (Clip #1) recorded in the optical disc. FIG. 4B illustrates additional PlayItems for controlling reproduction of the additional data downloaded from an external source. Herein, only additional PlayItem #1 and additional PlayItem #2 are downloaded, but no PlayList is downloaded. As described above, in the system, since there is no PlayList acting as the reproducing unit, the additional PlayItem #1 and the additional PlayItem #2 cannot be played-back independently, which eventually implies that the additional data cannot be reproduced independently as well.

In addition, FIG. 4B is an example of two additional PlayItems (additional PlayItem #1 and additional PlayItem #2) for controlling the additional data being associated with the original data. The additional PlayItem #1 designates an additional clip (Clip #2), and the additional PlayItem #2 designates two additional clips (Clip #3, Clip #4). More specifically, the additional PlayItems (PlayItem #1 and PlayItem #2) are files controlling the additional clips. For example, the PlayItem #1 designates the audio stream (Clip #2), the PlayItem #2 designates both the presentation graphic stream (Clip #3) and the interactive graphic stream (Clip #4). Therefore, the first embodiment of the present invention is controlled by the additional PlayItem having no PlayList for reproducing the additional data. However, each of the additional PlayItems designates at least one additional clip.

FIG. 4C illustrates a new PlayList (PlayList #2) having a Composite PlayItem according to the first embodiment of the present invention. The original PlayItem and the additional PlayItems are bound together. More specifically, the original PlayItem (shown in FIG. 4A) recorded within the optical disc is bound together with the additional PlayItems (shown in FIG. 4B) downloaded from the external source (e.g., from the Internet) to create a new Composite PlayItem. Then, a new PlayList (PlayList #2) including the new Composite PlayItem is created. Subsequently, the new PlayList (PlayList #2) is stored in a memory (numeral 15 of FIG. 9) within the optical recording and/or reproducing apparatus 10, which then performs playback operations in accordance with a user's command. Alternatively, when the user desires to reproduce the additional data downloaded from the external source, instead of being stored in the memory (numeral 15 of FIG. 9), the new PlayList is temporarily created to be used for playback. Evidently, when the additional PlayItem is downloaded, the designated additional data (i.e., Clip #2, Clip #3, Clip #4) are also downloaded and stored in the memory (numeral 15 of FIG. 9) and, then, used. The method for controlling and playing-back the new PlayList (PlayList #2) will be described in detail in a later process with reference to FIGS. 8A to 10.

Accordingly, a modified usage of the first embodiment can be applied to the present invention. For example, a method of providing each additional clip with an additional PlayItem controlling the additional data may be proposed. In this case, an additional PlayItem designating and controlling each of the additional clip #3 and additional clip #4, both shown in FIG. 4B, should be separately provided, and a Composite PlayItem is created and used by binding both additional PlayItems. Furthermore, in order to create the new PlayList (PlayList #2) as described above, the association between the original PlayItem and the additional PlayItem should be defined. For example, an identical file name is used, or a file name of the PlayList (PlayList #1) associated with the additional PlayItem is recorded, or a table (e.g., a "LinkPlayList_Table") for showing the link (or association) between the original PlayList and the additional PlayList is required to be defined as a separate control information. A detailed description will follow in a later process with reference to FIGS. 7A and 7B.

Figure 5A:
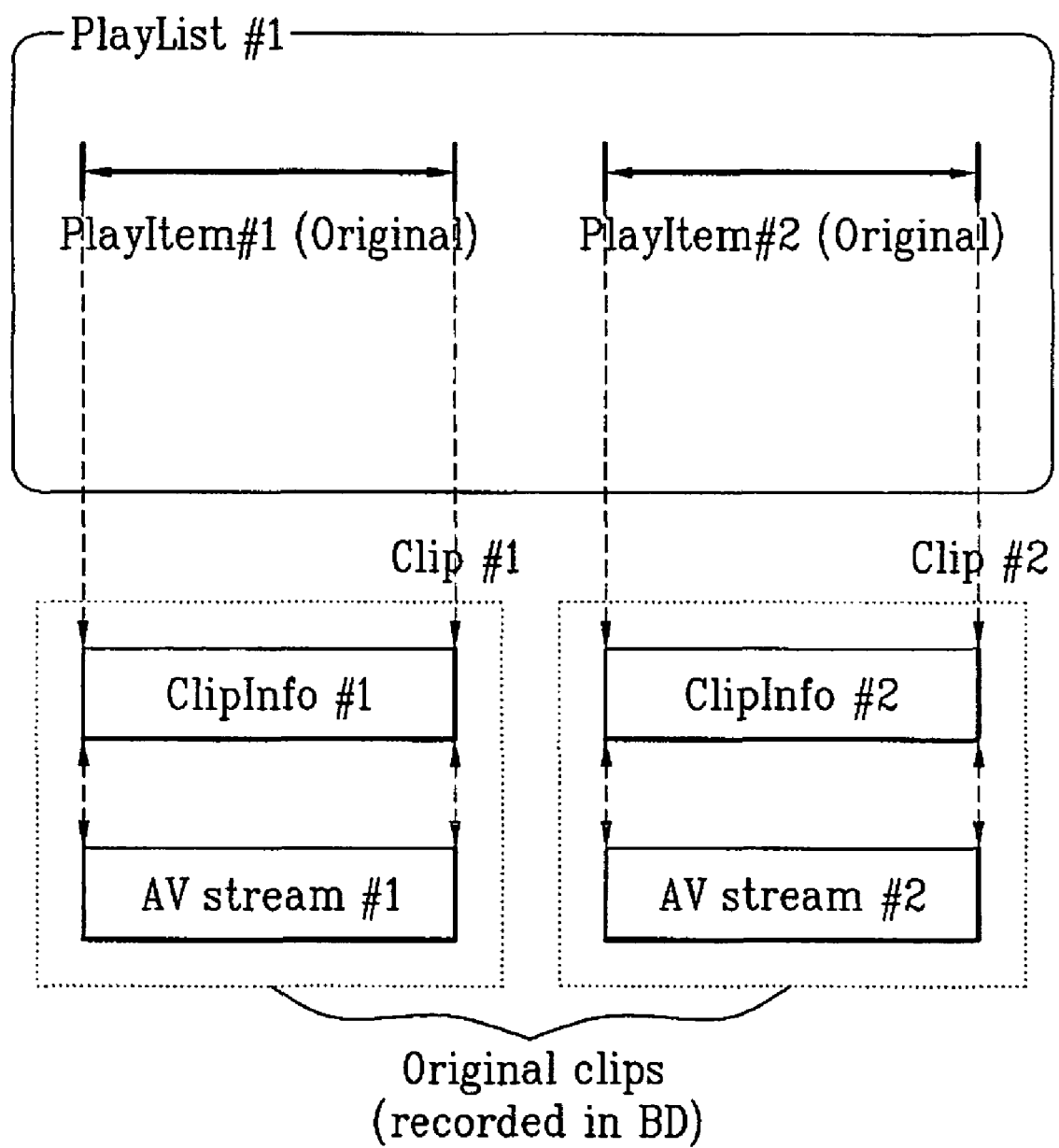
FIGS. 5A to 5D illustrate a method of creating a playback control file according to a second embodiment of the present invention.
Figure 5B:
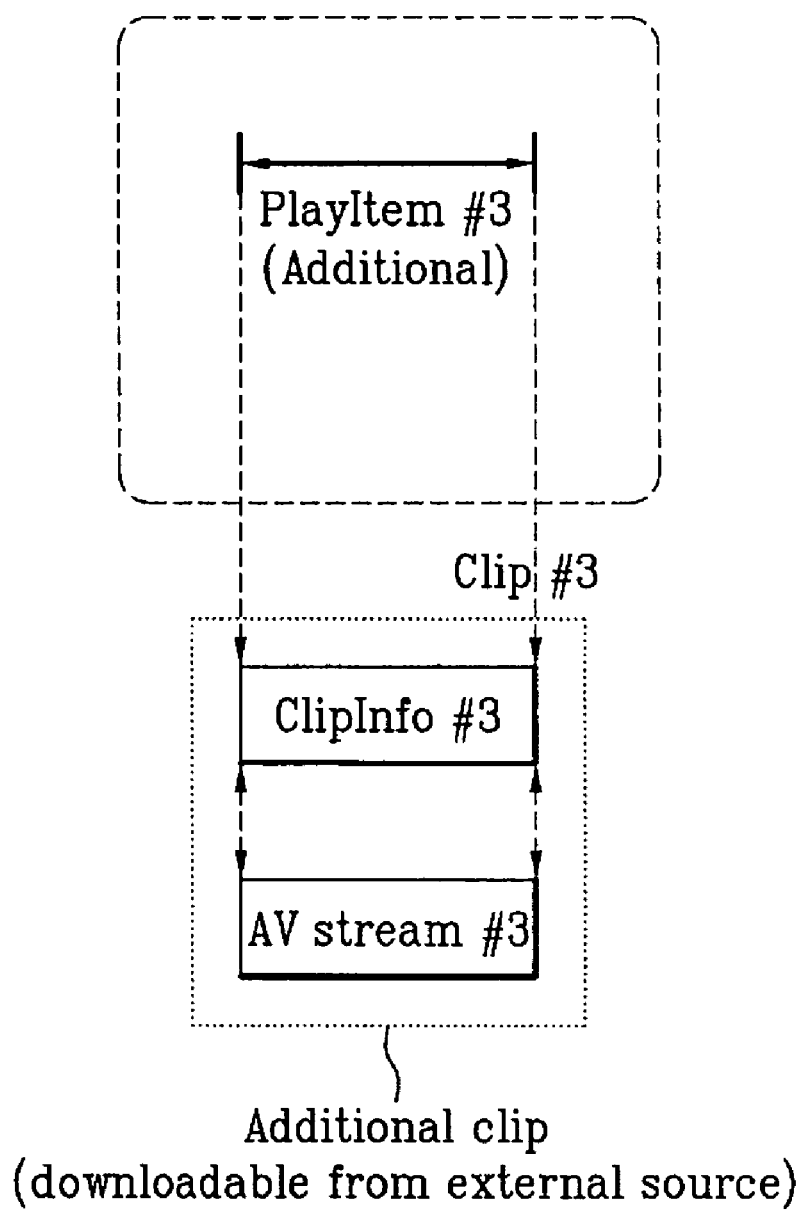

FIGS. 5A to 5D illustrate a method of creating a PlayList according to a second embodiment of the present invention, wherein the PlayList is playback control file. FIG. 5A illustrates an original PlayList (PlayList #1) recorded on an optical disc. Herein, a plurality of PlayItems is included in the original PlayList, and the original data of the original PlayItem #1 designates a corresponding original clip (Clip #1) recorded in the optical disc, and the original data of the original PlayItem #2 designates a corresponding original clip (Clip #2) also recorded in the optical disc. FIG. 5B illustrates an additional PlayItem for controlling reproduction of the additional data downloaded from an external source. Herein, only additional PlayItem #3 is downloaded, but no PlayList is downloaded. As described above, in the system, since there is no PlayList acting as the reproducing unit, the additional PlayItem #3 cannot be played-back independently, which eventually implies that the additional data cannot be reproduced independently as well. In addition, FIG. 5B is an example of one additional PlayItem (PlayItem #3) for controlling the additional data associated with the original data. The additional PlayItem #3 designates an additional clip (Clip #3). More specifically, the additional PlayItem (PlayItem #3) is a file controlling the additional clip. For example, the PlayItem #3 designates an audio stream (Clip #3) of a specific language.

Figure 5C:
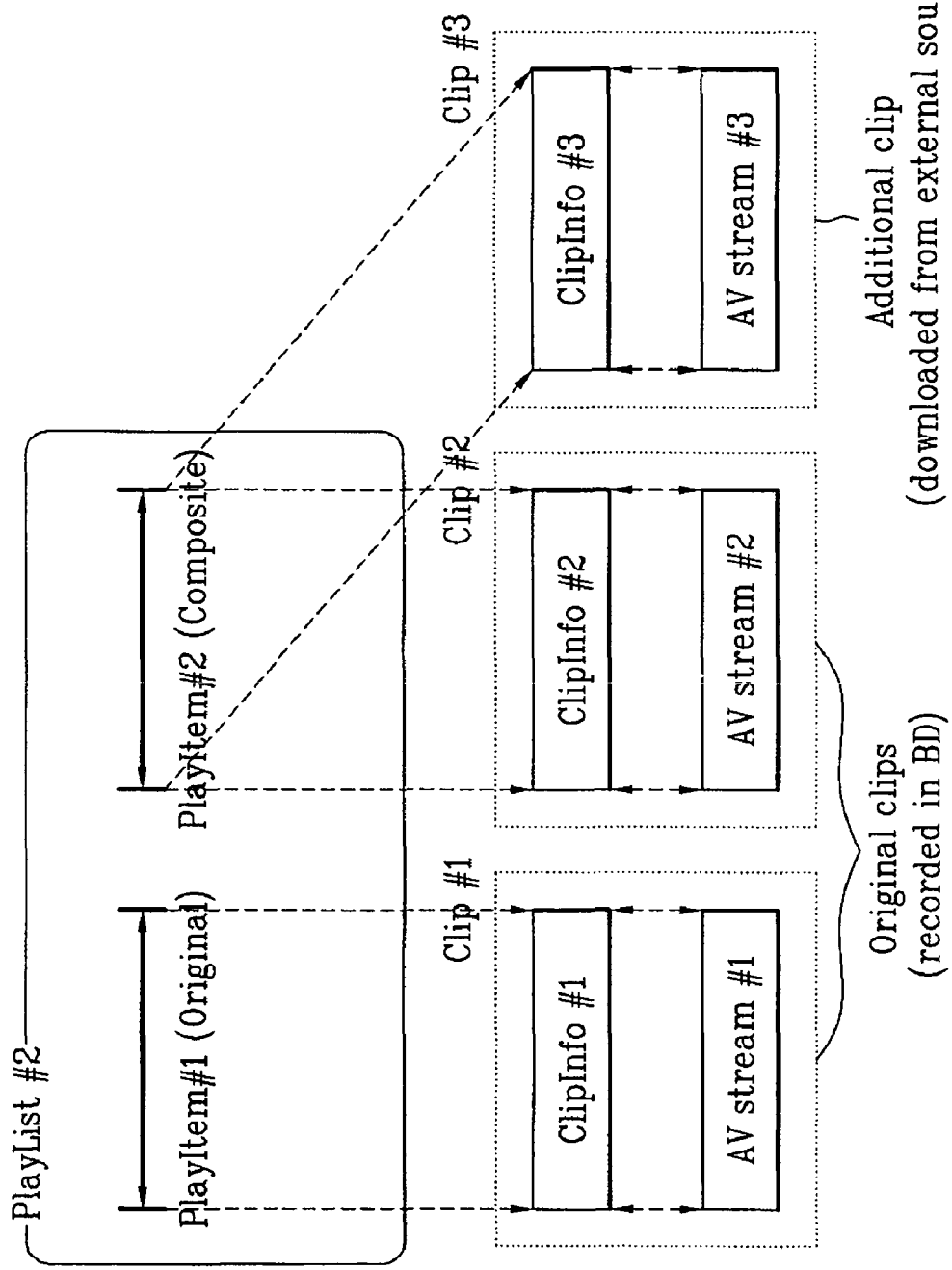

FIG. 5C illustrates a new PlayList (PlayList #2) according to the second embodiment of the present invention, wherein the original PlayItems and the additional PlayItem are bound together. More specifically, one of a plurality of original PlayItems (PlayItem #1, PlayItem #2), which is recorded within the optical disc, is chosen and bound with an additional PlayItem (shown in FIG. 5B), so as to create a new composite PlayItem, the method of creating a new PlayList including the new composite PlayItem will be also described herein. For example, when the original PlayItem #2 is bound with the additional PlayItem (shown in FIG. 5B) so as to create the composite PlayItem #2, a new PlayList file becomes a playback control file consisting of the original PlayItem #1 and the composite PlayItem #2. More specifically, since the additional PlayItem may be bound with only a specific original PlayItem among a plurality of original PlayItems, a partial binding with the initial PlayList may also be performed.

Figure 5D:
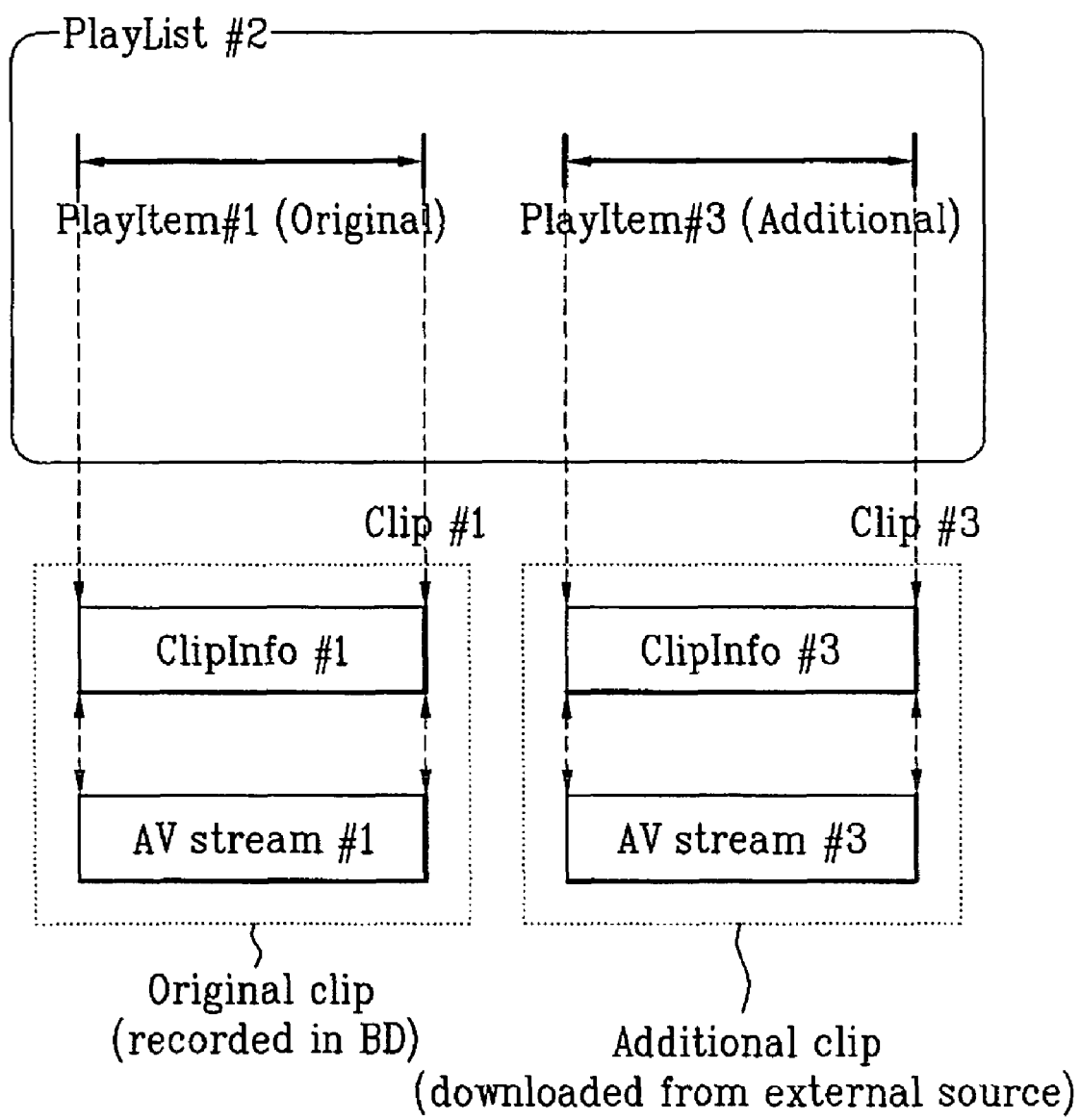

FIG. 5D illustrates another example of a new PlayList (PlayList #2) according to the second embodiment of the present invention, wherein an original PlayItem and an additional PlayItem are used. More specifically, one of a plurality of original PlayItems (PlayItem #1, PlayItem #2), which is recorded within the optical disc, is replaced (or substituted) with an additional PlayItem (shown in FIG. 5B), so as to create a new PlayList. For example, by replacing the original PlayItem #2 with the additional PlayItem (shown in FIG. 5B), the new PlayList file becomes a playback control file including the PlayItem #1 and the PlayItem #3. Therefore, when the new PlayList replaces a specific original clip including the original data (i.e., the Clip #2 including a Korean language audio stream) with a specific additional clip including the additional data (i.e., the Clip #3 including an English language audio stream), thereby enabling a partial modification of the initial PlayList to be performed.

Accordingly, a modified usage of the second embodiment of the present invention can also be proposed. For example, instead of binding (as shown in FIG. 5C) or replacing (as shown in FIG. 5D) part of the original PlayItem with the additional PlayItem controlling the additional data, a method of simply adding another PlayItem may be proposed. More specifically, the new PlayList may include all of PlayItem #1, PlayItem #2, and PlayItem #3 without modification. Furthermore, in order to create the new PlayList #2 according to the second embodiment of the present invention, the association between the original PlayItem and the additional PlayItem should be maintained. Therefore, the method should further include data designating a specific PlayItem of the PlayList #1 associated with the additional PlayItem and data indicating the association between the designated PlayItem (e.g., binding, replacement, addition). A detailed description will follow in a later process with reference to FIGS. 7A and 7B.

Figure 6A:
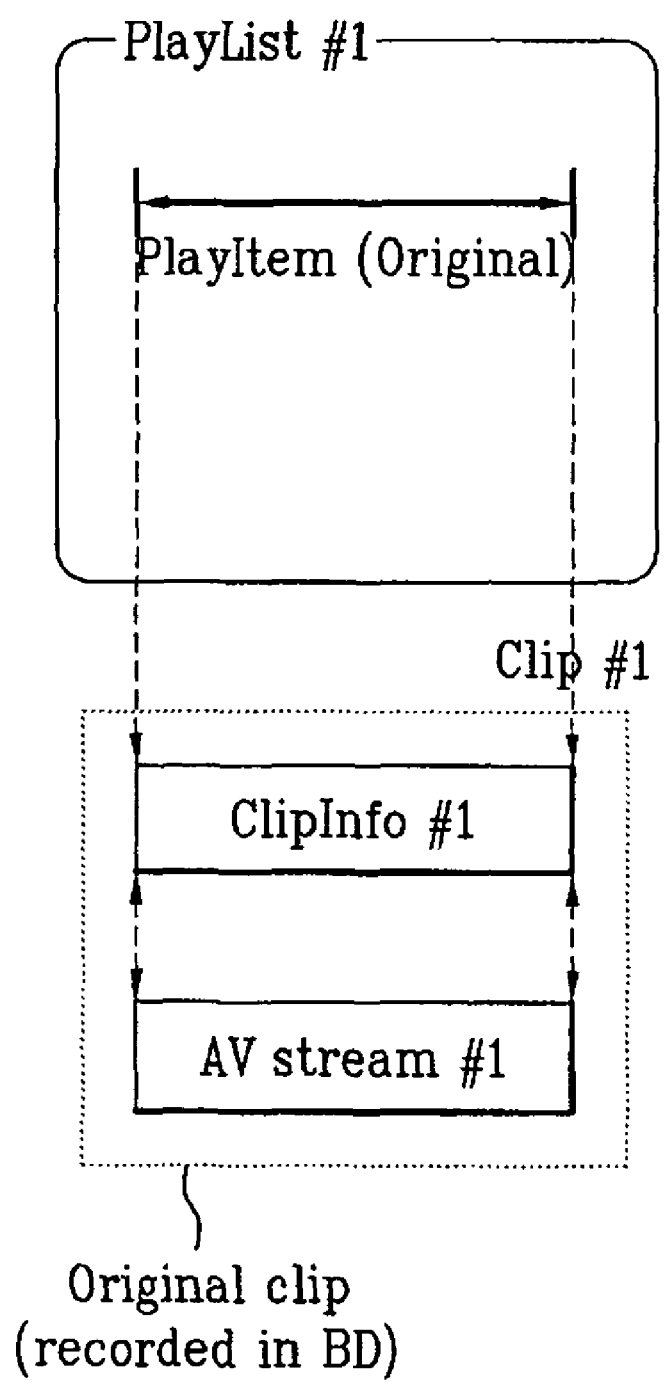
FIGS. 6A to 6C illustrate a method of creating a playback control file according to a third embodiment of the present invention.
Figure 6B:
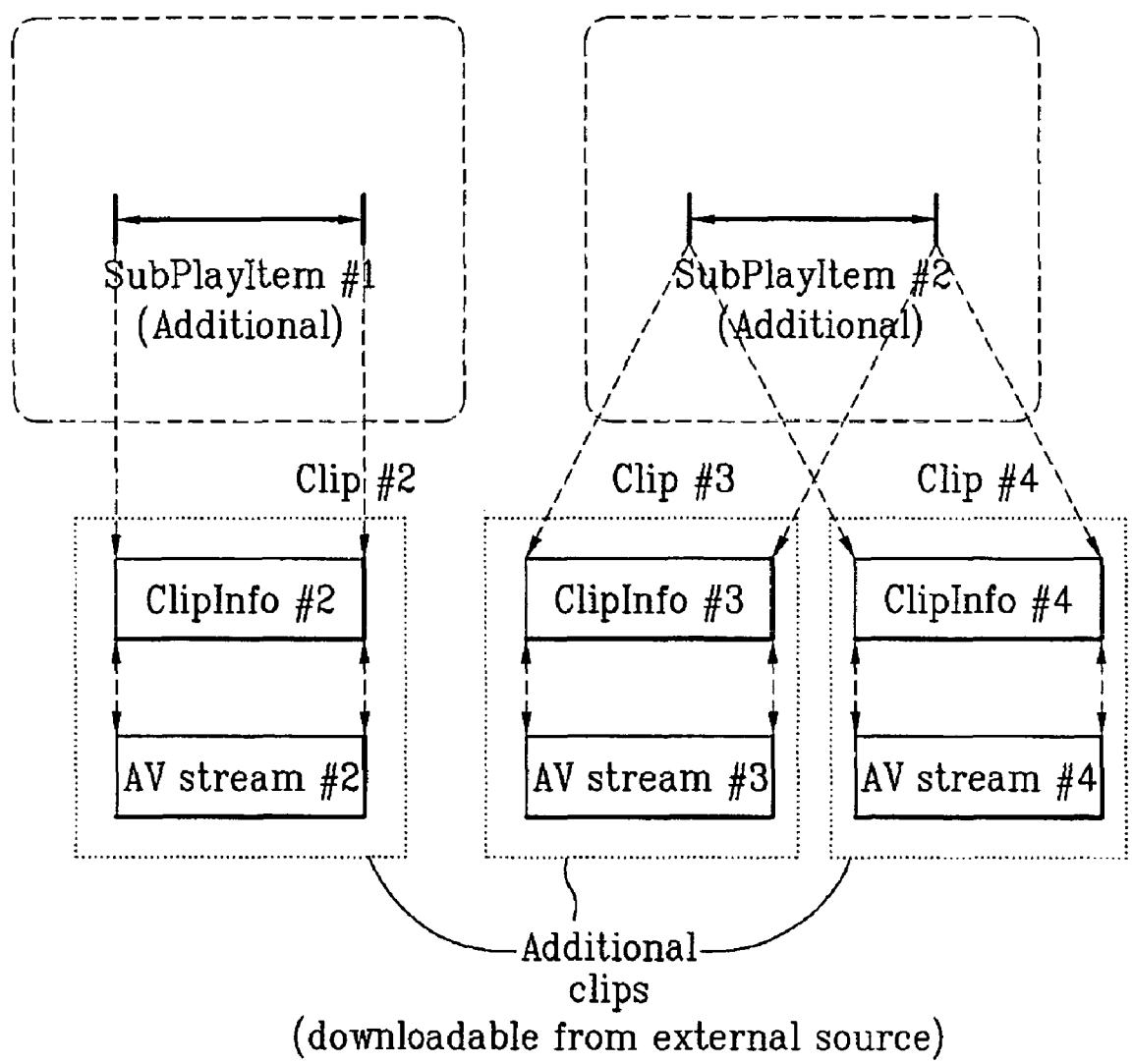
Figure 6C:
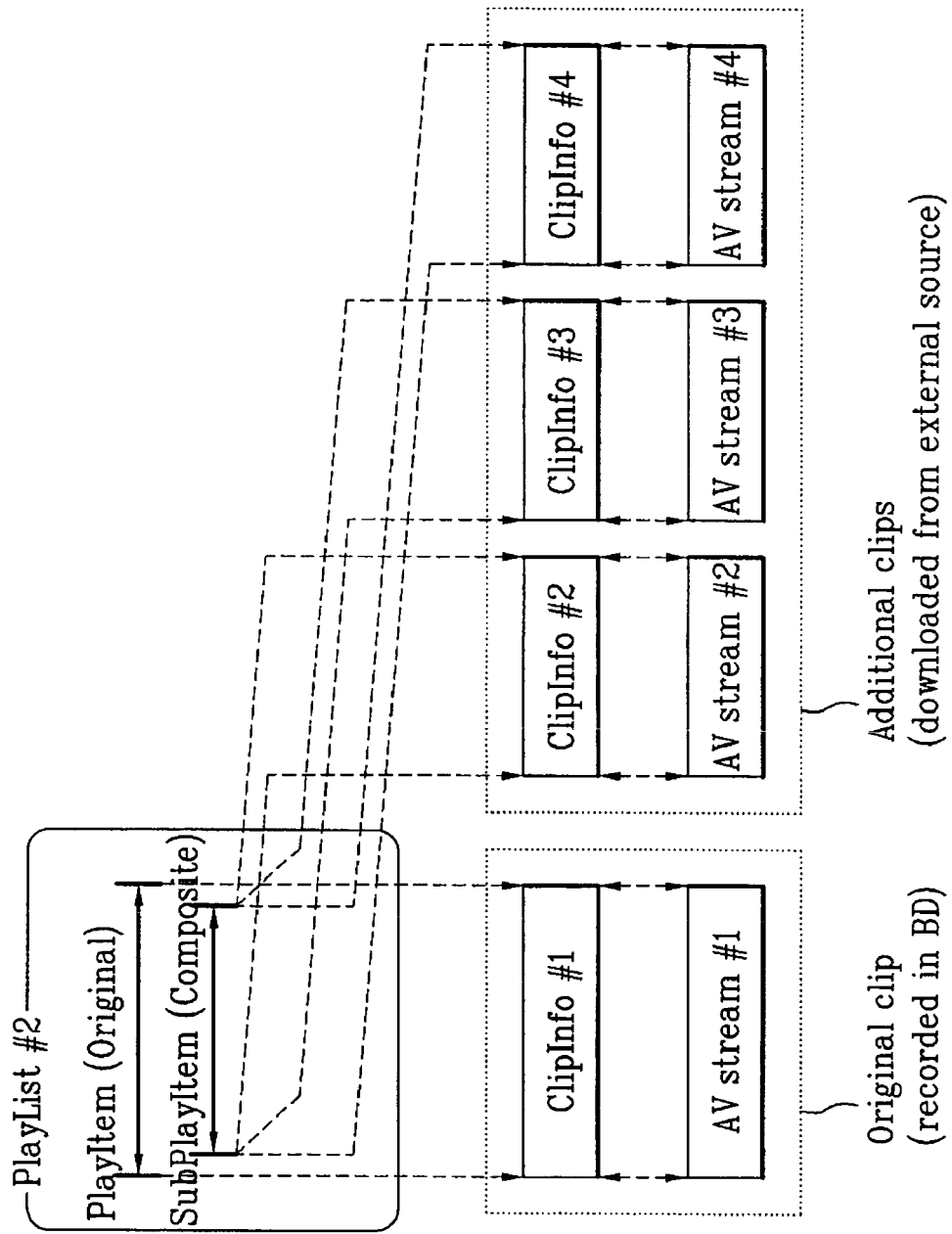

FIGS. 6A to 6C illustrate a method of creating a playback control file according to a third embodiment of the present invention. FIG. 6A illustrates an original PlayList (PlayList #1) recorded on the optical disc. Herein, one original PlayItem is included within the PlayList, and the original PlayItem designates a corresponding original clip (Clip #1). FIG. 6B illustrates additional SubPlayItems for controlling the reproduction of the additional data downloadable from an external source. Herein, only an additional SubPlayItem is downloaded, but no PlayList is downloaded. In addition, FIG. 4B is an example of two additional SubPlayItems (SubPlayItem #1 and SubPlayItem #2) for controlling the additional data. The SubPlayItem #1 designates one clip (Clip #2), and the SubPlayItem #2 designates two additional clips (Clip #3, Clip #4). More specifically, the additional SubPlayItems (SubPlayItem #1 and SubPlayItem #2) are files controlling the additional data associated with the original data. For example, the SubPlayItem #1 designates the audio stream (Clip #2), the SubPlayItem #2 designates both the presentation graphics stream (Clip #3) and the interactive graphics stream (Clip #4).

Therefore, the third embodiment of the present invention is controlled by the additional SubPlayItem having no PlayList for reproducing the additional data. However, each of the additional SubPlayItems designates at least one additional clip. FIG. 6C illustrates an example of a new PlayList #2 according to the third embodiment of the present invention, which can reproduce all of the original data and the additional data. Herein, the additional SubPlayItems (SubPlayItem #1, SubPlayItem #2) each controlling the additional data are bound together, so as to create a composite SubPlayItem. The original PlayItem and the new composite SubPlayItem are both included in the PlayList #2.

FIGS. 7A and 7B illustrate examples of a file structure recorded within the optical disc and a file structure for additional data corresponding to the recorded file structure according to the present invention, wherein the optical disc is the recording medium. In FIG. 7A, the file structure for controlling the original data is identical to the file structure shown in FIG. 2, wherein the file for controlling the additional data downloaded from the external source is given the same file name as that of the related original data file. Most particularly, an example of the file extension being named identically 100 and an example of the file extension being named differently 200 will be described in detail.

In the example of the file extension being named identically 100, "11111.mpls" and "22222.mpls" exist as the PlayLists recorded within the optical disc. And, by identically naming the external files controlling the corresponding additional data "11111.mpls" and "22222.mpls", respectively, and when the file for the additional data is downloaded, the optical recording and/or reproducing apparatus 10 can bind the downloaded file with the PlayList file having the same file name within the optical disc, thereby creating a new PlayList. In this case, although the downloaded file 100 is named as "*.mpls", the file is only given the format of the PlayList file and is used to maintain the association between the PlayList files (11111.mpls and 22222.mpls) recorded within the corresponding optical disc.

Alternatively, in the example of the file extension being named differently 200, whereas the file name is identical, "11111.mpls" and "22222.mpls" exist as the PlayLists recorded within the optical disc. And, the external files controlling the corresponding additional data are given the same name, whereas the file extension is named differently depending upon the information provided within the file, such as "11111.mapi (or 11111.masp)" and "22222.mapi (or 22222.masp)". Thus when the file for the additional data is downloaded, the downloaded file can be bound together with the PlayList file having the same file name within the optical disc, thereby creating a new PlayList.

More specifically, as described in each of the above embodiments, only the original PlayList is provided in the PlayList files "11111.mpls" and "22222.mpls" recorded within the optical disc. The additional PlayList is provided in "*.mapi" being the downloaded file 200, and the additional SubPlayItem is provided in "*.masp". Furthermore, an additional advantage of the present invention is that when the files are named as "*.mapi" or "*.masp", the file cannot become PlayLists (*.mpls), thereby allowing the system to easily recognize that such files cannot be independently reproduced. Accordingly, as shown in the above-described second embodiment of the present invention (shown in FIGS. 5A to 5D), when a corresponding specific original PlayList is required to be designated, the corresponding specific original PlayList and its correlation (e.g., PlayItem_#1_replace or PlayItem_#2_composite) should be defined within the downloaded file ("*.mpls" or "*.mapi").

FIG. 7B illustrates a file structure for the original data recorded within the optical disc and a file structure for the additional data existing in an external source. More specifically, herein a PlayList file (*.cpls) which can be reproduced by binding together with the additional data and a PlayList (*mpls) for playback controlling only the original data are differentiated within the file structure for controlling the original data in order to maintain the association between the original data and the additional data. The process will now be described in detail.

Upon forming the file structure for controlling the original data recorded within the optical disc, the manufacturer predetermines whether the original data can be reproduced by being bound together with the additional data. Then, the general PlayList independently reproducing the original data without the additional data is named as "*.mpls" (e.g., 11111.mpls and 22222.mpls), and the PlayList binding and reproducing the original data with the additional data is named as "*.cpls (for composite PlayList)" (e.g., 33333.cpls and 44444.cpls). Therefore, the system can identify the "*.cpls" file as a file that can be reproduced independently, as well as a file that can be bound and reproduced with the additional data existing in the external source, depending upon the user's demand.

Accordingly, the file for the additional data that can be bound together with the original data can be named identically as the file for the corresponding original data. In this case, as described in FIG. 7A, the file may have the same file extension 300, or the file may have a different file extension 400. More specifically, the file for the additional data may be named as "*.cpls" 300, or the file for the additional data may be named as either "*.capi" or "*.casp" 400, the description of which is identical to that of FIG. 7A and will, therefore, be omitted for simplicity.

Figures 8A, 8B:
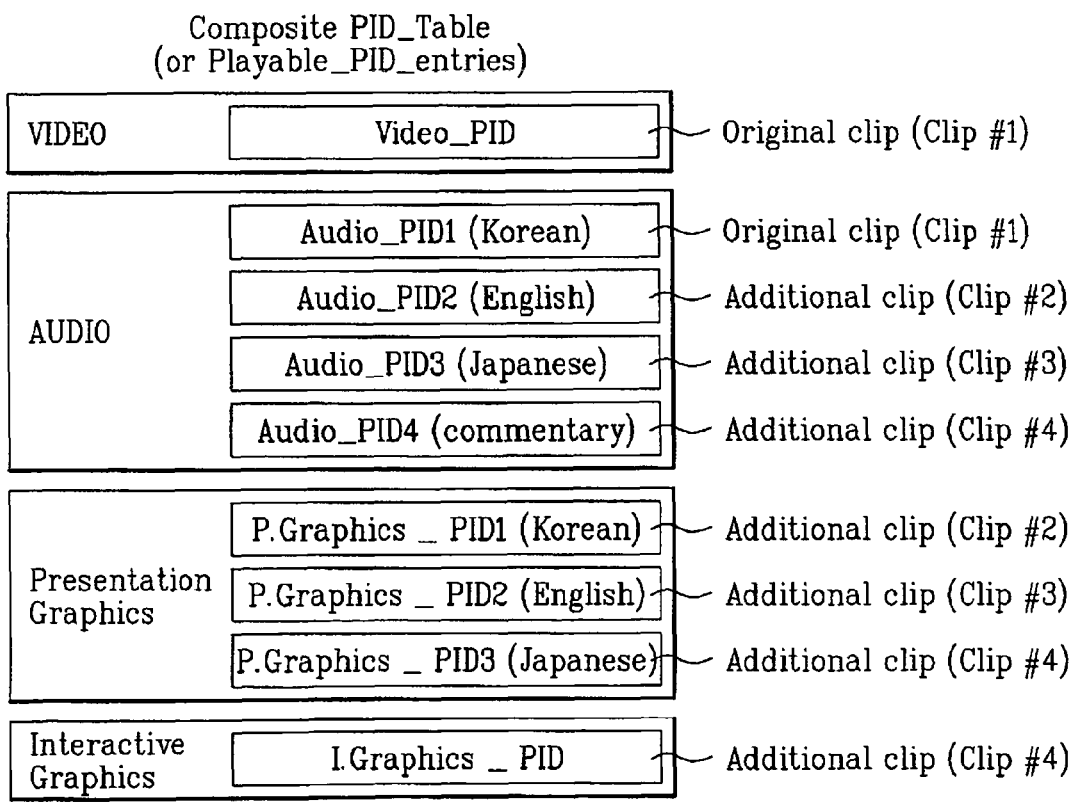
FIGS. 8A to 8C illustrate a method for controlling the playback control file according to the present invention.
Figure 8C:
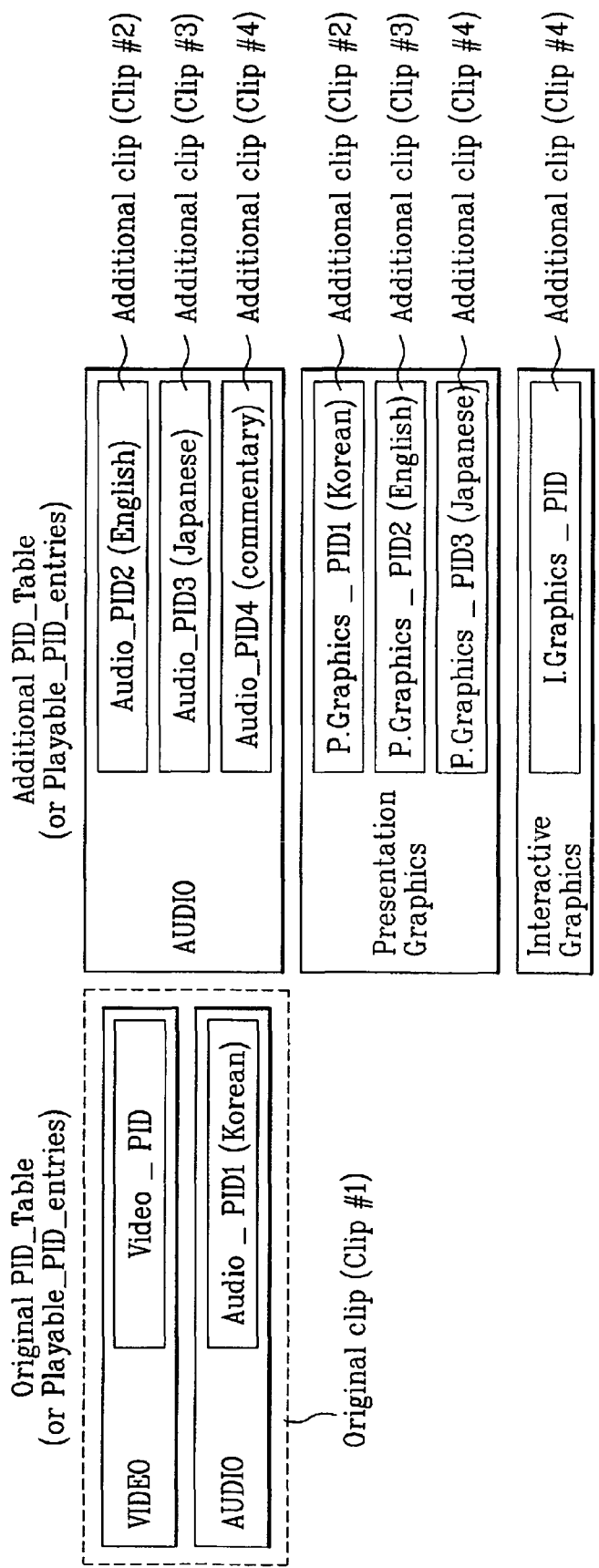

Hereinafter, a method for controlling the PlayList (PlayList #2) according to the present invention will be described in detail with reference with reference to FIGS. 8A to 8C. Herein, the control information, which allows any one of the original data and the additional data to be selected, is recorded on a specific location within a final PlayList file. The control information shown in FIGS. 8A to 8C is recorded in the form of a Packet Identification (PID) table. Generally, PID is information being recorded on an MPEG-2 transport stream, wherein an identical ID is given to an identical packet so as to allow an AV decoder (numeral 17 of FIG. 9) to selectively decode a packet having an identical PID value. Therefore, the PID_Table is a type of control information for controlling the PBD information in the form of a table. And, when a user desires to reproduce some specific data, the PID_Table may be used as reference information.

FIG. 8A illustrates an example of a syntax of the PID_Table, which is recorded on a specific location within the final PlayList (PlayList #2). Herein, the PID_Table is formed of PID_entries, and each of the PID_entries includes a corresponding ref_to_stream_PID(k), and an Additional_PlayItem_num, when attributes and a SubPlayItem also exists. The PID_Table having the above-described configuration can be recorded within a PlayList (PlayList #2), within a composite PlayItem or within a composite SubPlayItem. Also, the PID_Table can form a Composite PBD_Table wherein the original data and the additional data are bound together, or the PID_Table can separate the PID_Table for the original data from the PBD_Table for the additional data. And, the method for forming the PID_Table will now be described in more detail with reference to FIGS. 8B and 8C.

FIG. 8B illustrates an example of a Composite PID_table, wherein the original data and the additional data are bound together. The example shown in FIG. 8B includes one original clip (Clip #1) and three additional clips (Clip #2, Clip #3, Clip #4). More specifically, the Composite PID_Table of FIG. 8B is a method for forming and controlling all the PID information existing within the original clip (Clip #1) and the additional clips (Clip #2, Clip #3, Clip #4), which are controlled by the PlayList (PlayList #2), are formed and controlled by using a single table. Accordingly, the user is able to select a reproduction method that he or she desires (e.g., selecting a video in the original sound (or English)). And, depending upon the user selection, the optical recording and/or reproducing apparatus 10 refers to the PID_Table being recorded on a specific location within the PlayList (PlayList #2), so as to reproduce the video from the video stream of the original clip (Clip #1) and to reproduce the original sound (or English) from the audio stream (in English) of the additional clip (Clip #2), thereby meeting with the user's demands.

FIG. 8C illustrates an example of forming a PID_Table for each of the original data and the additional data, which are separated from each other. The example shown in FIG. 8C includes one original clip (Clip #1) and three additional clips (Clip #2, Clip #3, Clip #4). More specifically, since an Original PID_Table already exists within an initial PlayList (PlayList #1) for the original data, a duplicate Original PID_Table is not re-formed, and instead, only Additional PID_Tables for the additional data being controlled by the composite PlayItem or the composite SubPlayItem are bound together and formed. Furthermore, the Composite PID_Table, shown in FIG. 8B, and the Additional PID_Table, shown in FIG. 8C, can be recorded within the final PlayList (PlayList #2), within the composite PlayItem, or within the composite SubPlayItem, as described above. However, it is preferable that the Composite PID_Table is recorded within the PlayList (PlayList #2), and that the Additional PID_Table is recorded within the composite PlayItem or the composite SubPlayItem.

Apart from the method for controlling the Composite PlayList by using one of the Composite PID_Table and the Additional PID_Table, a method of defining attributes for each additional clip being controlled by the composite SubPlayItem or the composite PlayItem and, then, automatically reproducing the additional clip when the user selects the corresponding attribute is also proposed. For example, the original clip is automatically reproduced when there is no user-selected attribute. Then, since the attributes for each additional clip are defined within the Composite PlayList, when the user selects a specific attribute, e.g., an audio stream (in English), existing within the additional clip, the additional clip #2 corresponding to the audio stream (in English) is automatically reproduced.

Figure 9:
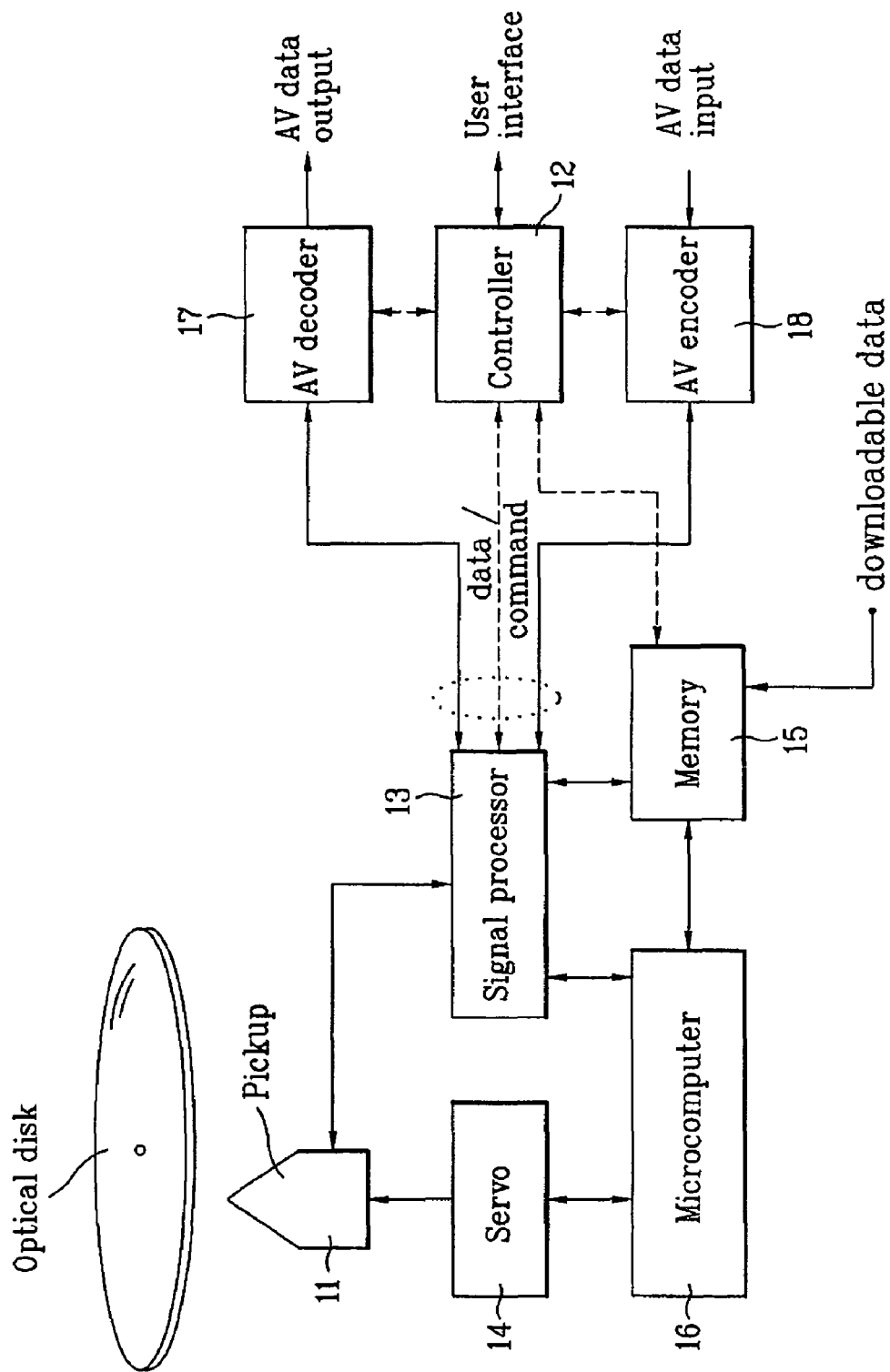
FIG. 9 illustrates an optical recording and/or reproducing apparatus according to the present invention.

FIG. 9 illustrates an optical recording and/or reproducing apparatus 10 according to the present invention, which creates and controls the PlayList. The optical recording and/or reproducing apparatus 10 basically includes a pick-up unit 11 for reproducing the control information including the original data and the original PlayList recorded on the optical disc, a servo 14 controlling the operations of the pick-up unit 11, a signal processor 13 either recovering the playback signal received from the pick-up unit 11 to a desired signal value, or modulating a signal to be recorded to an optical disc recordable signal and transmitting the modulated signal, and a microcomputer 16 controlling the above operations.

As the method of creating the final PlayList (PlayList #2), as described in the first embodiment of the present invention (shown in FIG. 4C), upon receiving a user command, for example, the controller 12 downloads the additional data and the additional PlayItem, downloaded from the external source, and stores the downloaded additional data and additional PlayItem in the memory 15. Subsequently, the controller 12 binds the original PlayItem reproduced from the optical disc with the additional PlayItem downloaded from the external source, so as to create the Composite PlayItem, and stores the new Composite PlayItem in the memory 15. In addition, as the method of creating the final Playlist (PlayList #2), as described in the second embodiment according to the present invention (shown in FIGS. 5C and 5D), upon receiving a user command, for example, a controller 12 downloads the additional data and the additional PlayItem, downloaded from the external source, and stores the downloaded additional data and additional PlayItem in a memory 15. The controller 12 either creates a composite PlayItem by binding the downloaded additional PlayItem with a specific original PlayItem so as to reproduce the additional data (as shown in FIG. 5C), or adds an additional PlayItem replacing the specific original PlayItem (as shown in FIG. 5D), thereby creating the final PlayList (PlayList #2), which is then stored in the memory 15.

Furthermore, as the method of creating the final PlayList (PlayList #2), as described in the third embodiment of the present invention (shown in FIG. 6C), the controller 12 downloads the additional data and the additional PlayItem, downloaded from an external source, and stores the downloaded additional data and additional PlayItem in the memory 15. Subsequently, the controller 12 creates a composite SubPlayItem for reproducing the additional data, thereby creating the final PlayList (PlayList #2) including the composite SubPlayItem and the original PlayItem, which is then stored in the memory 15. An AV decoder 17 performs final decoding of output data (i.e., the original data and/or the additional data) depending upon the controls of the controller 12.

In the above-described structure, the memory 15 storing the final PlayList (PlayList #2) and the additional data may either use a separate storing means (e.g., a local storage) for further storing purposes, or use a dynamic memory for temporarily storing data. In case the memory uses the separate local storage for further storing purposes, it is preferable that the final PlayList (PlayList #2), which stored in the local storage, is given more priority in usage over the usage of the initially recorded PlayList (PlayList #1). Furthermore, in order to perform the function of recording a signal on the optical disc, an AV encoder 18 converts an input signal into a signal of a specific format (e.g., an MPEG-2 transport stream) depending upon the controls of the controller 12 and, then, provides the converted signal to the signal processor 13.

Figure 10:
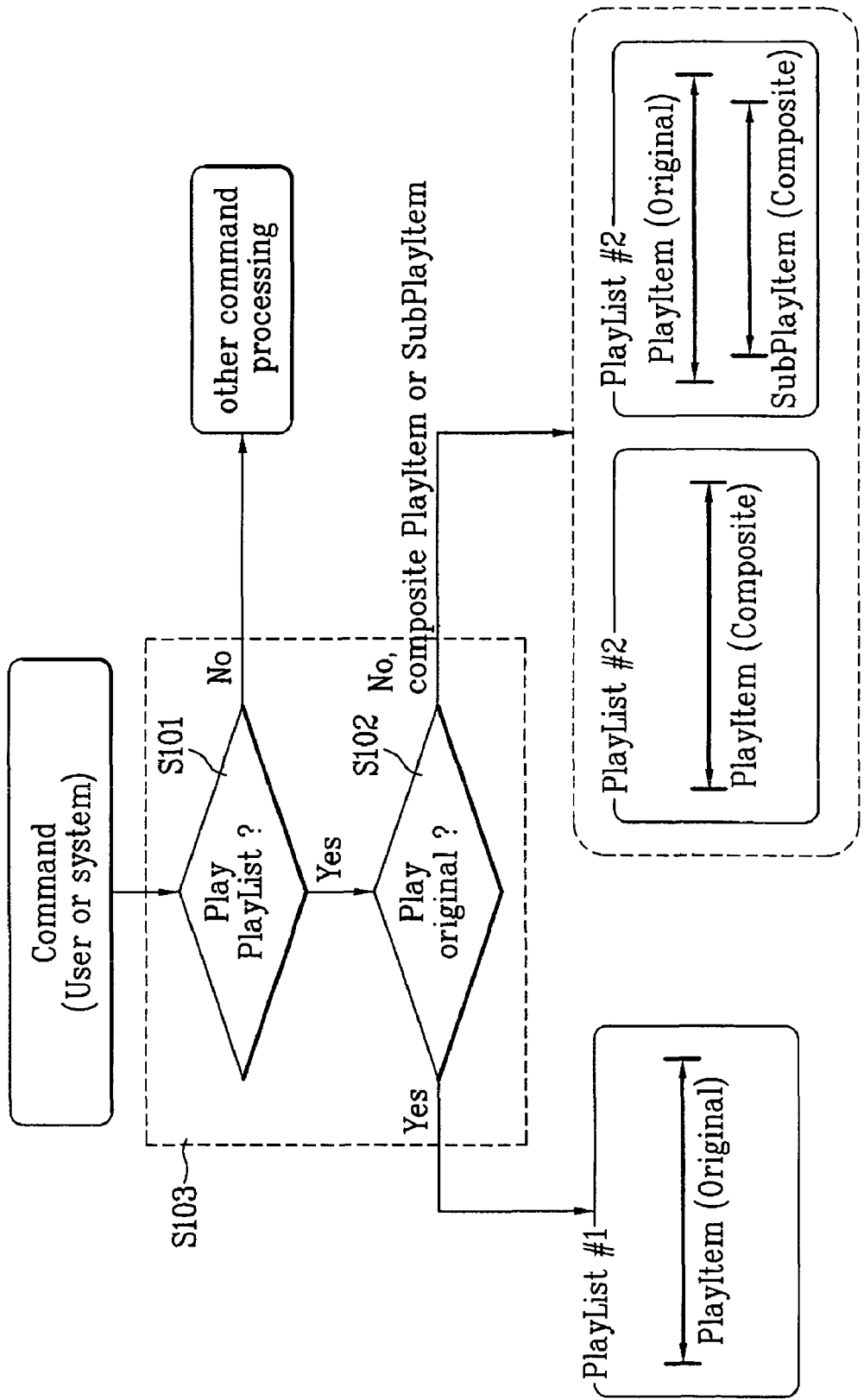
FIG. 10 illustrates a method for reproducing data recorded on the recording medium and data of an external source existing outside of the recording medium according to the present invention.

FIG. 10 illustrates a method for reproducing an optical disc according to the present invention. After creating the final PlayList (PlayList #2) by using the optical recording and/or reproducing apparatus 10, depending upon the user command or the system command, the PlayItem that is to be reproduced is selected. More specifically, the selectable PlayItem includes any one of the original PlayItem included in PlayList #1 being recorded within the optical disc, the composite PlayItem formed by binding the additional PlayItem downloaded from the external source with the original PlayItem, and a composite SubplayItem being bound together with the additional PlayItem. Then, based on the user selection or the system selection, the original data and/or the additional data being controlled by the corresponding PlayItem is reproduced.

More specifically, when playing-back the PlayList through a playback command (S101), a type of PlayItem (or SubPlayItem) within the PlayList is selected (S102), which may include selecting and playing-back the original PlayItem for only reproducing the original data and, also, selecting and playing-back a composite PlayItem (or a composite SubPlayItem) for reproducing the additional data along with the original data. Furthermore, the PlayList is played-back by a command, without specifying any of the above-described steps (S101 or S102), either PlayList #1 being recorded within the optical disc may be played-back in order to reproduce the original data, or a newly created and stored PlayList #2 may be played-back in order to reproduce the additional data along with the original data (S103).

As described above, the method of creating a playback control file for a recording medium and the method and apparatus for reproducing data using the playback control file have the following advantages. The original data being recorded on the recording medium and the additional data existing in an external source can be more effectively used, thereby enhancing product efficiency and facilitating the user's use of the product.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of reproducing first data stored on a first recording medium and second data stored on a second recording medium, the method being performed by a reproduction apparatus, the method comprising:

reading a first playlist from the first recording medium, the first playlist being configured to reproduce first data stored on the first recording medium;

reading a second playlist from the second recording medium, the second playlist being configured to reproduce second data stored on the second recording medium, wherein the second recording medium is physically separated from the first recording medium and the second data is downloaded from an external source onto the second recording medium for providing additional data associated with the first data stored on the first recording medium;

creating, by the reproduction apparatus, a third playlist, the third playlist configured to reproduce the first data and the second data from the first recording medium and the second recording medium, wherein the third playlist includes control information having a plurality of entries, each of the entries including a packet ID enabling at least one stream to be selected from the first data stored on the first recording medium and the second data stored on the second recording medium; and reproducing the first and second data using the third playlist.

2. The method of claim 1, wherein the control information included in the third playlist includes packet ID information designating the at least one stream.

3. The method of claim 1, wherein the third playlist is created by binding the first playlist and the second playlist based on file name information.

4. The method of claim 1, wherein the third playlist includes at least one playitem configured to reproduce the first data and at least one subplayitem configured to reproduce the second data.

5. The method of claim 4, wherein the control information is included in the third playlist in the form of a Packet ID table.

6. The method of claim 4, wherein the control information includes attribute information of the at least one stream.

7. The method of claim 4, wherein the control information is included in the playitem in the form of a Packet ID table, and the Packet ID table contains Packet ID information for the first and second data.

8. The method of claim 4, wherein the control information is included in the playitem in the form of a first Packet ID table and a second Packet ID table, and the first Packet ID table contains Packet ID information for the first data and the second Packet ID table contains Packet ID information for the second data.

9. The method of claim 4, wherein the control information is included in the subplayitem in the form of a Packet ID table.

10. The method of claim 4, wherein the playitem included in the third playlist contains same information as a playitem included in the first playlist stored on the first recording medium.

11. The method of claim 4, wherein the at least one playitem designates a stream file of the first data.

12. The method of claim 4, wherein the at least one subplayitem designates a stream file of the second data.

13. The method of claim 1, wherein the first data is main data and the second data is auxiliary data for reproducing the first data.

14. The method of claim 1, wherein the second data is data downloaded from an external source.

15. An apparatus for reproducing first data recorded on a first recording medium, the first recording medium having a first playlist to reproduce the first data, comprising:

a pickup unit configured to read data from the first recording medium;

a second recording medium configured to store second data and a second playlist, the second playlist being configured to reproduce the second data stored on the second recording medium, wherein the second recording medium is physically separated from the first recording medium and the second data is downloaded from an external source onto the second recording medium for providing additional data associated with the first data recording medium; and a controller, operatively coupled to the pickup unit and the second recording medium, configured to control identifying the first recording medium loaded into the apparatus and control the pickup unit to read the first playlist from the first recording medium, and the controller configured to control reading the second playlist from the second recording medium and control creating a third playlist to reproduce the first data and the second data from the first recording medium and the second recording medium, and the controller configured to further control reproducing the first and second data based on the third playlist, wherein the controller is configured to control creating the third playlist including control information having a plurality of entries, each of the entries including a packet ID enabling at least one stream to be selected from the first data stored on the first recording medium and the second data stored on the second recording medium.

16. The apparatus of claim 15, wherein the control information included in the third playlist includes packet ID information designating the at least one stream.

17. The apparatus of claim 15, wherein the controller is configured to control creating the third playlist by binding the first playlist and the second playlist based on file name information.

18. The apparatus of claim 15, wherein the controller is configured to control creating the third playlist including at least one playitem configured to reproduce the first data and at least one subplayitem configured to reproduce the second data.

19. The apparatus of claim 18, wherein the control information is included in the third playlist in the form of a Packet ID table.

20. The apparatus of claim 18, wherein the control information includes attribute information of the at least one stream.

21. The apparatus of claim 18, wherein the control information is included in the playitem in the form of a Packet ID table, and the Packet ID table contains Packet ID information for the first and second data.

22. The apparatus of claim 18, wherein the control information is included in the playitem in the form of a first Packet ID table and a second Packet ID table, and the first Packet ID table contains Packet ID information for the first data and the second Packet ID table contains Packet ID information for the second data.

23. The apparatus of claim 18, wherein the control information is included in the subplayitem in the form of a Packet ID table.

24. The apparatus of claim 15, wherein the controller is configured to control reproducing the first data as main data and the second data as auxiliary data for reproducing the first data.

25. The apparatus of claim 15, wherein the controller is configured to control downloading the second data from an external source.

26. A method of creating a reproduction control data for a first recording medium having a first playlist for controlling reproduction of original data recorded on the first recording medium, the method being performed by a control data creating apparatus, the method comprising:

creating a second playlist including control data for controlling reproduction of additional data downloadable from an external source, wherein the additional data is associated with the original data recorded on the first recording medium;

creating link information including file name information indicating how to combine the first playlist and the second playlist; and creating, by the apparatus, a third playlist by combining the first playlist with the second playlist based on the link information, the third playlist including control information having a plurality of entries, each of the entries including a packet ID enabling at least one stream to be selected from the first data stored on the first recording medium and the second data stored on a second recording medium.

27. The method of claim 26, wherein the control information included in the third playlist includes packet ID information designating the at least one stream.

28. The method of claim 26, wherein the third playlist is created by binding the first playlist and the second playlist based on file name information.

29. The method of claim 26, wherein the third playlist includes at least one playitem configured to reproduce the first data and at least one subplayitem configured to reproduce the second data.

30. The method of claim 29, wherein the control information is included in the third playlist in the form of a Packet ID table.

31. The method of claim 29, wherein the control information includes attribute information of the at least one stream.

32. The method of claim 29, wherein the control information is included in the playitem in the form of a Packet ID table, and the Packet ID table contains Packet ID information for the first and second data.

33. The method of claim 29, wherein the control information is included in the playitem in the form of a first Packet ID table and a second Packet ID table, and the first Packet ID table contains Packet ID information for the first data and the second Packet ID table contains Packet ID information for the second data.

34. The method of claim 29, wherein the control information is included in the subplayitem in the form of a Packet ID table.

35. An apparatus for reproducing data, comprising:

a first storage configured to store first data and a first playlist, the first playlist being configured to reproduce first data stored on the first storage;

a second storage configured to store second data and a second playlist, the second playlist being configured to reproduce second data stored on the second storage wherein the second storage is physically separated from the first storage and the second data is downloaded from an external source onto the second storage for providing additional data associated with the first data stored on the first storage; and a controller, operatively coupled to the first storage and the second storage, configured to control creating a third playlist to reproduce the first data and the second data from the first storage and the second storage, and the controller configured to further control reproducing the first and second data by using the third playlist, wherein the third playlist includes control information having a plurality of entries, each of the entries including a packet ID enabling at least one stream to be selected from the first data stored on the first recording medium and the second data stored on the second recording medium.

* * * * *